(12) United States Patent
Wakabayashi et al.

(10) Patent No.: US 6,876,506 B1
(45) Date of Patent: Apr. 5, 2005

(54) INFORMATION RECORDING MEDIUM, INFORMATION RECORDING/REPRODUCING HEAD, AND INFORMATION STORAGE DEVICE

(75) Inventors: Koichiro Wakabayashi, Toride (JP); Nobuyuki Inaba, Hasuda (JP); Teruaki Takeuchi, Ibaraki (JP)

(73) Assignee: Hitachi Maxell, Ltd., Ibaraki (JP)

( * ) Notice: Subject to any disclaimer, the term of this patent is extended or adjusted under 35 U.S.C. 154(b) by 0 days.

(21) Appl. No.: 09/959,854

(22) PCT Filed: May 10, 2000

(86) PCT No.: PCT/JP00/02977

§ 371 (c)(1), (2), (4) Date: Nov. 9, 2001

(87) PCT Pub. No.: WO00/68947

PCT Pub. Date: Nov. 16, 2000

(30) Foreign Application Priority Data

May 11, 1999 (JP) .......................... 11-129337

(51) Int. Cl.$^7$ ................................. G11B 5/09
(52) U.S. Cl. ..................... 360/48; 360/77.08
(58) Field of Search ............... 360/48, 77.08, 360/131–137, 29, 67, 75, 46, 113, 119, 121

(56) References Cited

U.S. PATENT DOCUMENTS

| | | | | |
|---|---|---|---|---|
| 4,737,869 A | * | 4/1988 | Sugaya et al. | 360/77.08 |
| 5,677,807 A | * | 10/1997 | Sakai | 360/77.13 |
| 5,754,354 A | * | 5/1998 | Tomita et al. | 360/61 |
| 5,786,958 A | * | 7/1998 | Negishi et al. | 360/77.01 |
| 5,867,337 A | * | 2/1999 | Shimomura | 360/75 |
| 6,104,562 A | * | 8/2000 | Ottesen et al. | 360/75 |
| 6,181,505 B1 | * | 1/2001 | Sacks et al. | 360/77.08 |
| 6,313,964 B1 | * | 11/2001 | Lamberts et al. | 360/75 |
| 6,429,994 B1 | * | 8/2002 | Le et al. | 360/77.02 |
| 6,606,216 B1 | * | 8/2003 | Liikanen et al. | 360/77.08 |

FOREIGN PATENT DOCUMENTS

| | | | |
|---|---|---|---|
| JP | 5-20818 | 1/1993 | |
| JP | 05-020818 | * 1/1993 | ........... G11B/21/10 |
| JP | 5-298840 | 11/1993 | |
| JP | 05-298840 | * 12/1993 | ........... G11B/21/10 |
| JP | 6-139727 | 5/1994 | |
| JP | 06-139727 | * 5/1994 | ........... G11B/21/10 |
| JP | 10-149524 | * 2/1998 | ........... G11B/5/596 |
| JP | 10-149524 | 6/1998 | |
| JP | 11-16307 | 1/1999 | |

* cited by examiner

Primary Examiner—Sinh Tran
Assistant Examiner—Glenda P. Rodriguez
(74) Attorney, Agent, or Firm—Birch, Stewart, Kolasch & Birch, LLP

(57) ABSTRACT

An information recording medium, an information recording/reproduction head, and an information storage device are provided for performing a track servo operation at a smaller track pitch than that conventionally used without reducing the widths of servo burst patterns. The widths of servo burst patterns (107, 108, 109, 110) are increased over a track pitch (TP) and the end of the servo burst pattern is disposed so as not to coincide with a center line (111) of an information track. In addition, a servo magnetic head (112) and a reproduction magnetic head (113) are implemented in one magnetoresistance element (159).

5 Claims, 15 Drawing Sheets

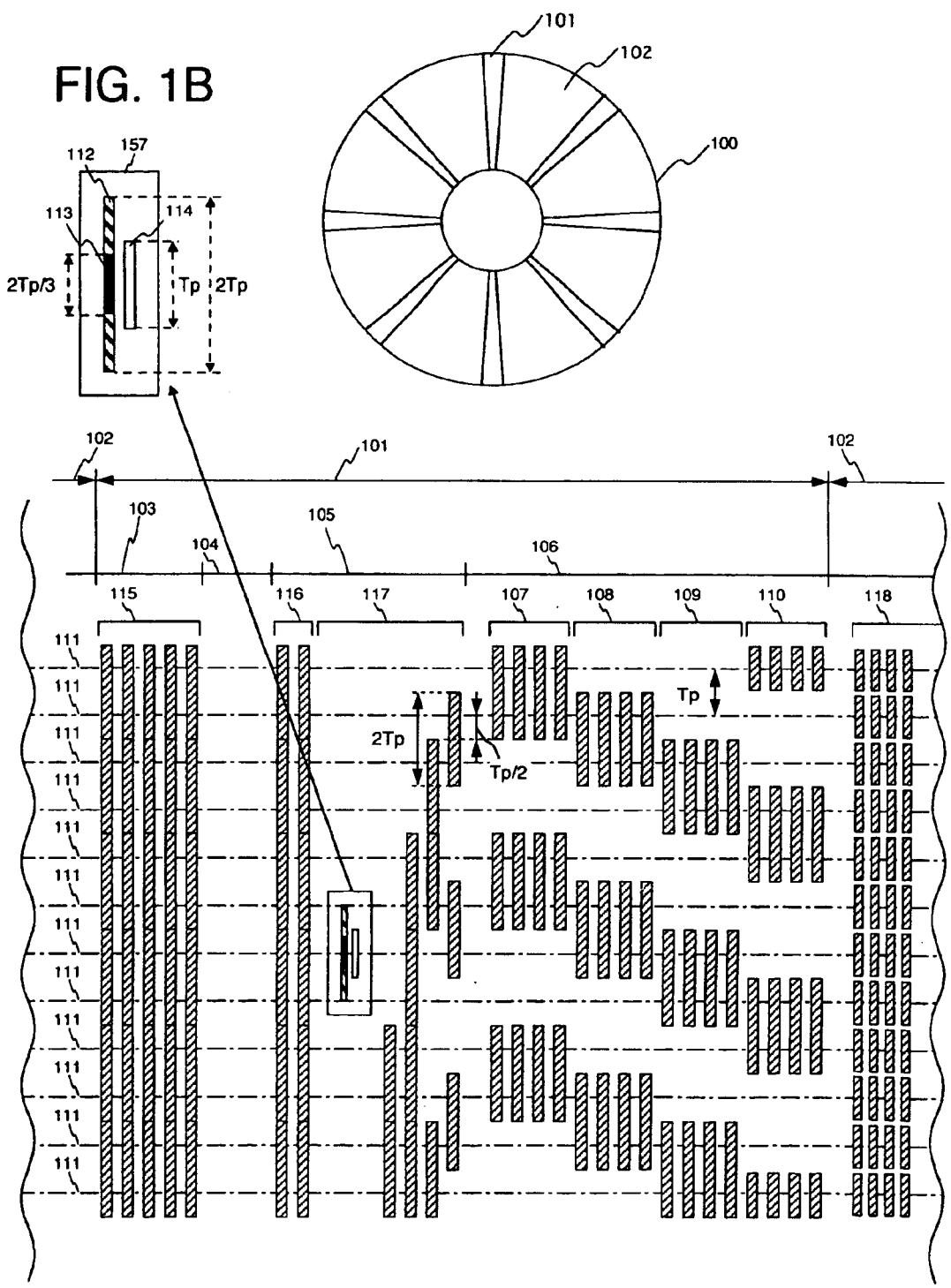

INFORMATION RECORDING MEDIUM, INFORMATION RECORDING/REPRODUCING HEAD, AND INFORMATION STORAGE DEVICE

This application is the national phase under 35 U.S.C. § 371 of PCT International Application No. PCT/JP00/02977 which has an International filing date of May 10, 2000, which designated the United States of America.

TECHNICAL FIELD

1. Field of Industrial Application

The present invention relates to an information recording medium for recording information thereon, an information recording/reproduction head for recording or reproducing information on the information recording medium, and an information storage device for storing information through the use of the information recording medium and the information recording/reproduction head.

2. Background Art

A magnetic recording/reproducing apparatus arranged to record an information mark having magnetic property on an information track included in the information recording medium as the magnetic head is scanning the medium, detect a magnetic field leaked from the information mark, and thereby reproduce the information is required to keep the magnetic head accurately following the information track for the purpose of accurately recording information on the information track and reproducing the information recorded on the information track. As a method of responding to this requirement, a track servo method has been proposed in which the use of the information recording medium having a servo burst pattern for a track servo makes it possible for the magnetic head to accurately follow the information track. The use of this method makes it possible to detect a positional shift of the magnetic head against the information track by reproducing the servo burst pattern with the magnetic head and thereby to correct the positional shift of the magnetic head on the basis of the detected positional shift information.

FIGS. 12A and 12B are an overall view and a track-magnified view of the discussed information recording medium where the servo burst pattern is recorded. A numeral 500 denotes an information recording medium composed of a positioning area 501 and a data storage area 502, which medium is rotated by a motor (not shown). If a user requests to record data, a recording magnetic head 513 is located on the concerned information track 511 where the data is to be recorded, the track being included in the data storage area 502, so that the information may be recorded as a data pattern 518. If the data recorded as the data pattern 518 is reproduced, a reproduction magnetic head 512 is located on the concerned information track 511 included in the data storage area 502, for reproducing the data pattern 518. The positioning area 501 is served for the recording magnetic head 513 and the reproduction magnetic head 512 to follow the concerned information track 511 where the target data is to be recorded or reproduced. The positioning area 501 is composed of a synchronous area 503, an erasing area 504, a track code area 505 and a track servo area 506. The synchronous area 503 includes a synchronous pattern 515 pre-recorded thereon, the synchronous pattern 515 composed of a repetition of recording portions and non-recording portions along the information track 511. By reproducing this synchronous pattern 515 with the reproduction magnetic head 512, a reproduction signal can be obtained. From this reproduction signal is generated a synchronous signal synchronized with the rotation of the information recording medium 500. By using the reproduction signal of the synchronous pattern 515, an automatic gain control can be also executed for determining an amplification factor at which the reproduction signal is to be amplified. The erasing area 504 is secured for identifying the positioning area 501. The track code area 505 includes a track code start pattern 516 and a track code pattern 517 pre-recorded thereon. The track code start pattern 516 represents a start of a track code. The track code pattern 517 is generated by patterning the track code according to the predetermined coding rules. As the track code pattern 517, generally, a reflected binary code (Gray code) is widely used. The reflected binary code is characterized in that the binary expressions representing sequential decimal numbers differ in only one bit.

The track servo area 506 includes servo burst patterns 507 to 510 pre-recorded as shown in FIG. 12B. In the case of performing the track servo, the location of the reproduction head 512 is controlled so that a peak amplitude (envelope) obtained by reproducing the servo burst pattern 507 may coincide with a peak amplitude obtained by reproducing the servo burst pattern 508. Or, the location of the reproduction head 512 is controlled so that a peak amplitude obtained by reproducing the servo burst pattern 509 may coincide with a peak amplitude obtained by reproducing the servo burst pattern 510. The use of this method makes it possible to locate the reproduction head 512 on any of the information tracks 511 shown in FIG. 12A. The comparison of the peak amplitude between the servo burst patterns 507 and 508 or between the servo burst patterns 509 and 516 is determined on each of the information tracks. This determination is done by recognizing the previous track code.

In the meantime, the current main stream is the use of a magnetoresistance effect element as the reproduction magnetic head 512 and the use of a composite head composed of magnetic coils as the reproduction head 513. The magnetoresistance effect element has a greater sensitivity in converting the leaked magnetic head from the data pattern 518 into an electric signal, thereby offering a reproduction signal with an excellent S/N ratio. However, the magnetoresistance effect element has no capability of applying a magnetic field onto the information recording medium. Hence, the traditionally used magnetic coil is used for recording the information. It means that the composite head makes good use of both advantages. As described above, the magnetoresistance effect element has a greater sensitivity to the magnetic field, so that in the magnetoresistance effect element the orthogonal length (the width of the reproduction magnetic head) to the information track may be designed to be shorter than the track pitch Tp. In general, the width of the reproduction magnetic head 512 may be 0.5 to 0.8 Tp. Such a width is likely to prevent a crosstalk leaked from the adjacent track from being overlapped with the reproduction signal, thereby improving the S/N ratio or the reproduction signal. As a result, the design margin of the information recording apparatus may be magnified. As described above, in such a system that the reproduction magnetic head 512 is smaller in width than the track pitch Tp, as shown in FIG. 12B, it is necessary to make the orthogonal length (the width of the servo burst pattern) to the information track 511 of the servo burst patterns 507 to 510 substantially coincide with the width of the reproduction magnetic head 512. If each width of the servo burst patterns 507 to 510 is longer or shorter than that of the reproduction magnetic head 512, in a case that the reproduction magnetic head 512 is located around a middle area of the portion where the servo burst patterns 507 to 510 are recorded or around a middle area of the portion where the servo burst patterns 507 to 510 are not recorded, the peak amplitude is obtained irrespective of the location of the reproduction magnetic head 512, so that the peak amplitude is made constant. That is, this makes it impossible to obtain any track following error signal corresponding to the location error of the reproduction magnetic head 512 against the center of the track, thereby being unable to carry out the proper track servo. Hence, generally, the burst pattern width is 0.5 to 0.8 Tp that is shorter than the track pitch, though it may depend on the width of the used reproduction magnetic head. FIG. 12B shows the case where the width of the reproduction magnetic head 512 is ⅔ of the track pitch.

On the other hand, it is indispensable to narrow the track pitch for the purpose of improving the recording density in future. The specifications to the servo burst patterns 507 to 510 are made more strict accordingly. For example, for forming the servo patterns as shown in FIG. 12B in the track pitch Tp=0.6 $\mu$m, each width of the servo burst pattern 507 to 510 is as short as 0.4 $\mu$m. That is, disadvantageously, the S/N ratio of the track following error signal obtained by scanning the servo burst patterns 507 to 510 with the reproduction magnetic head 512 is more degraded than the conventional S/N ratio by a narrowed distance of each width of the servo burst patterns 507 to 510. In general, for enhancing the density by narrowing the track pitch, the track following accuracy is required to be improved as well. However, it is obvious that when the track servo is carried out by using the track following error signal whose S/N ratio is degraded than the discussed case, the positioning accuracy of the reproduction magnetic head 512 is degraded than the discussed case. In order to overcome this disadvantage, it is necessary to arrange such track servo means as realizing the track servo by a narrower track than the discussed example but keeping each width of the servo burst patterns 507 to 510 same as or larger than the discussed example.

As the prior art for solving this advantage, a track servo method has been disclosed in JP-A-1116307. In this method, the width of the servo burst pattern of the prior art corresponds to a doubled one of the track pitch Tp. Hence, the track servo can be realized at a narrower track than the discussed example without reducing the widths of servo burst patterns more than the discussed example. The overall view of a medium format formed by applying the servo burst pattern of the prior art to the discussed example is illustrated in FIG. 13A. The track-magnified view of the medium format is illustrated in FIG. 13B. An information recording medium 700 is composed of a positioning area 701 and a data storage area 502. The patterns recorded on the positioning area 701 are the same as those shown in FIG. 13B except the track servo area 706. A track code pattern 517 on a track code area 505 is described in the traditional Gray code. On a track servo area 706 are recorded the servo burst patterns 707 to 710 of the second discussed example. A magnetic head is composed of a recording magnetic head 721 for recording the burst patterns and a reproduction head 722 for reproducing information. The reproduction head 722 has a shorter core width than the recording a magnetic head 721. In doing the track servo, a track following error signal is generated from a reproduction signal obtained by scanning the servo burst patterns 707 to 710 with the reproduction head 722. The recording and reproduction head 720 is located on the track on the basis of this track following error signal.

In the prior art disclosed in JP-A-11-16307, as shown in FIG. 13B (the corresponding portion of the prior art is the servo burst pattern), each width of the servo burst patterns 707 to 710 in the positioning area 701 is twice as long as the track pitch Tp. The track servo thus can be realized at a narrower track pitch than the prior art without having to reduce the widths of servo burst patterns. However, if the servo burst patterns 707 to 710 are reproduced with the reproduction head 722, the reproduction head 722 does not have a wider width than the track pitch. As mentioned above, in the case of using the head with a wider head width than the track pitch, the crosstalk leaked from the adjacent track is overlapped with the reproduction signal, so that the resulting reproduction signal may have a degraded SIN ratio. What is concerned in this point is the SIN ratio of the track following error signal obtained by scanning the servo burst patterns 707 to 710 with the reproduction head 722. The S/N ratio of the track following error signal is made more excellent as the servo burst pattern is made longer in width and the reproduction magnetic head is longer in width. Though it is sure that the width of the reproduction magnetic head is twice as long as the track pitch, which is longer than the prior art, the reproduction magnetic head does not have a longer width than the track pitch or the like. In this case, the S/N ratio of the track following error signal is restricted by the reproduction magnetic head whose width is as long as the track pitch or the like. Hence, in view of the S/N ratio of the track following error signal, the servo burst patterns 707 to 710 each having a doubled width of the track pitch cannot be effectively used.

As another disadvantage, a blur area located on the end of the servo burst pattern causes the S/N ratio of the track following error signal to be degraded. Since the disordered leaked magnetic field is generated from the end of the recording head, the blur area where the magnetization is unstable is formed on the end of the recorded servo burst pattern. However, the discussed examples shown in FIGS. 12A, 12B, 13A and 13B, the track following error signal is generated by using the information located on the end of the servo burst pattern where the blur area is located. This disadvantage will be described with reference to FIG. 14. FIG. 14 shows the servo burst pattern described in JP-A-11-16307 shown in FIG. 13B. As described above, the blur area 738 is formed on each end of the servo burst patterns 707 to 710. In general, the reproduction magnetic head 722 has a reproduction sensitivity characterized as shown in FIG. 14, in which the most sensitive portion is the center of the head. Then, the peak amplitude (envelope) obtained by scanning the servo burst pattern A707 in the orthogonal direction to the information track 511 with the reproduction head 722 is called a peak amplitude 730. The peak amplitude obtained by scanning the servo burst pattern B708 in the same manner is called a peak amplitude 731. A track following error signal 732 is a subtraction of the peak amplitude 731 from the peak amplitude 730. A track following error signal 733 is a subtraction of the peak amplitude 730 from the peak amplitude 731. Further, the peak amplitude obtained by scanning the servo burst pattern C709 in the same manner is called a peak 734. The peak amplitude obtained by scanning the servo burst pattern D710 in the same manner is called a peak amplitude 735. A track following error signal 736 is a subtraction of the peak amplitude 735 from the peak amplitude 734. A track following error signal 737 is a subtraction of the peak amplitude 734 from the peak amplitude 734. At this time, the track servo is performed in the portions shown by the thick lines included in the track following error signals 732, 733, 736 and 737. The track servo is performed so that the position of the servo head 112 may be controlled so as to make these track following error signals 'zero (0)'. In the meantime, though the blur area 738 is unstable in the magnetizing state, in the prior art, this blur area 738 is located on the center of the track of the information track 511. The track servo is performed so as to make the track following error signal 'zero (0)', when the most sensitive portion of the reproduction magnetic head 722 is located on the center of the track of the information track 511. Hence, the blur 738 that is a factor to noises in reproduction is reproduced through the most sensitive portion of the reproduction magnetic head 722. Hence, the blur noise 740 as show in FIG. 14 is overlapped with the area around '0' of the track following error signal. That is, since the blur noise 740 causes the S/N ratio around the area '0' of the track following error signal to be degraded, the sufficient track following accuracy cannot be achieved.

Further, as disclosed in JP-A-11-16307 (servo burst pattern) of the prior art, the patterns in the positioning area 701 such as the servo burst patterns 707 to 710 shown in FIG. 13B are often pre-recorded with a track servo writer. Each width of the servo burst patterns 707 to 710 is twice as long as the track pitch Tp. The conventional track code pattern 517 used for describing the track code has a minimum recording unit width that is twice as long as the track pitch Tp. Hence, the recording width in recording the servo burst patterns with the track servo writer is just required to be twice as long as the track pitch. In the case of enhancing the density by narrowing the track pitch, the patterns in the positioning area 701 can be recorded with high accuracy. However, the central axes of the servo burst patterns 707 to 710 in the direction of the information track 511 are located on the information track 511, while the central axis of the minimum recording unit pattern forming the track code pattern 517 is located at a midpoint between the adjacent two information tracks 511. That is, in the case of recording the servo burst patterns 707 to 710 and the track code pattern 517 with the track servo writer in sequence, the recording head is required to be moved at a track pitch of Tp/2. As the track pitch is made narrower, the number of the information tracks on the information recording medium is increased more than that of the prior art. In the case of writing a requested pattern on the tracks of the information recording medium one by one, more time is needed in writing the patterns in more tracks than those of the prior art. Under these circumstances, if the patterns are recorded at a pitch of Tp/2 by the track servo writer, a massive length of time is needed until recording the requested pattern on the overall information recording medium is finished.

DISCLOSURE OF THE INVENTION

In order to solve the foregoing problems, it is an object of the present invention to provide a magnetic head having a simplified structure which is constructed to keep the width of the servo burst pattern if the track pitch is narrowed, obtain such a servo burst pattern as being adversely effected by the blur area on the end thereof in reproduction, and a track following error signal with a high S/N ration from the servo burst pattern, a track servo mechanism for locating the magnetic head on the track on the basis of the servo burst pattern, and an information storage device arranged to use the track servo mechanism.

In solving the foregoing problems, according to an aspect of the invention, (1) The width of the servo burst pattern is longer than the track pitch, the servo burst pattern is located in a manner to repetitively alternate a recording portion and a non-recording portion of the servo burst pattern and not to make the end of the servo burst pattern coincide with the center line of the information track in the orthogonal direction to the information track. On the other hand, the servo burst pattern is located in a manner to be shifted in the orthogonal direction to the information track by a predetermined length.

(2) The head to be used is one magnetoresistance element served as both a servo header having the substantially same width as the servo burst pattern and a reproduction head having a smaller width than the track pitch.

BRIEF DESCRIPTION OF THE DRAWINGS

FIGS. 1A and 1B are views showing an information recording medium according to an embodiment of the present invention;

BEST MODE FOR CARRYING OUT THE INVENTION

Figure 2A:
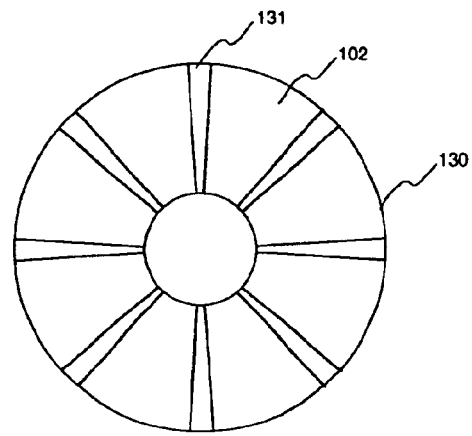
FIGS. 2A and 2B are views showing an information recording medium according to another embodiment of the present invention.

FIGS. 1A and 1B are an overall view and a track-magnified view showing an information recording medium according to an embodiment of the present invention. A numeral 100 denotes an information recording medium that is composed of a positioning area 101 and a data storage area 102. The user data is recorded in the data storage area 102 like the discussed example shown in FIGS. 12A and 12B and FIGS. 13A and 13B. The positioning area 101 is served as making the recording magnetic head 114 and the reproduction magnetic head 113 follow an information track where the data is to be recorded or reproduced. The positioning area 101 includes a synchronous area 103, an erasing area 104, a track code area 105, and a track servo area 106. The synchronous area 103 has a synchronous pattern 115 pre-recorded thereon, the synchronous pattern 115 being composed of a repetition of recording portions and non-recording portions along the information track 115. By reproducing this synchronous pattern 115 with the reproduction magnetic head 113, a reproduction signal can be generated. From the reproduction signal is generated a synchronous signal that is synchronized with the rotation of the information recording medium 100. Further, based on the reproduction signal of this synchronous patter 115, an auto gain control is performed for determining an amplification factor at which the reproduction signal is to be amplified. The erasing area 104 is provided for identifying the positioning area 101. The track code area 105 includes a track code start pattern 116 and a track code pattern 117 pre-recorded thereon. The track code start pattern 116 represents a start of the track code. The track code pattern 117 is generated by coding the track code according to the predetermined coding rules.

The track servo area 106 has servo burst patterns 107 to 110 pre-recorded thereon. Conventionally, for keeping the reproduction magnetic head 113 following the information track 111, the servo burst patterns 107 to 110 have been scanned by the reproduction magnetic head 113 for obtaining a track following error signal corresponding to the positional shift of the reproduction magnetic head 113 and the recording magnetic head 114. On the contrary, according to this embodiment of the invention, by scanning the servo burst patterns 107 to 110 with the servo head 112, it is possible to obtain the track following error signal corresponding to the positional shift of the reproduction head 113 and the recording head 114.

Figure 3A:
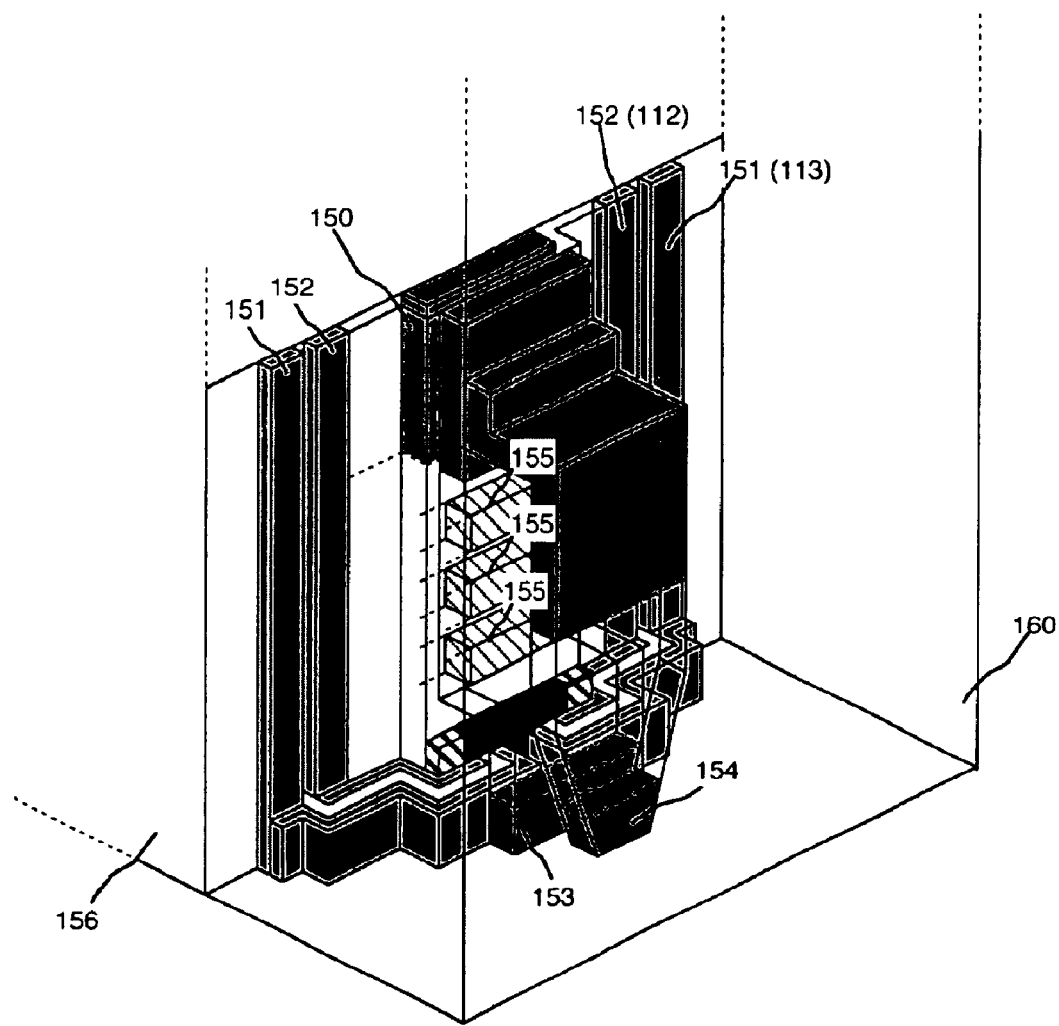
FIGS. 3A, 3B and 3C are views showing one embodiment of a head according to the present invention.
Figure 3B:
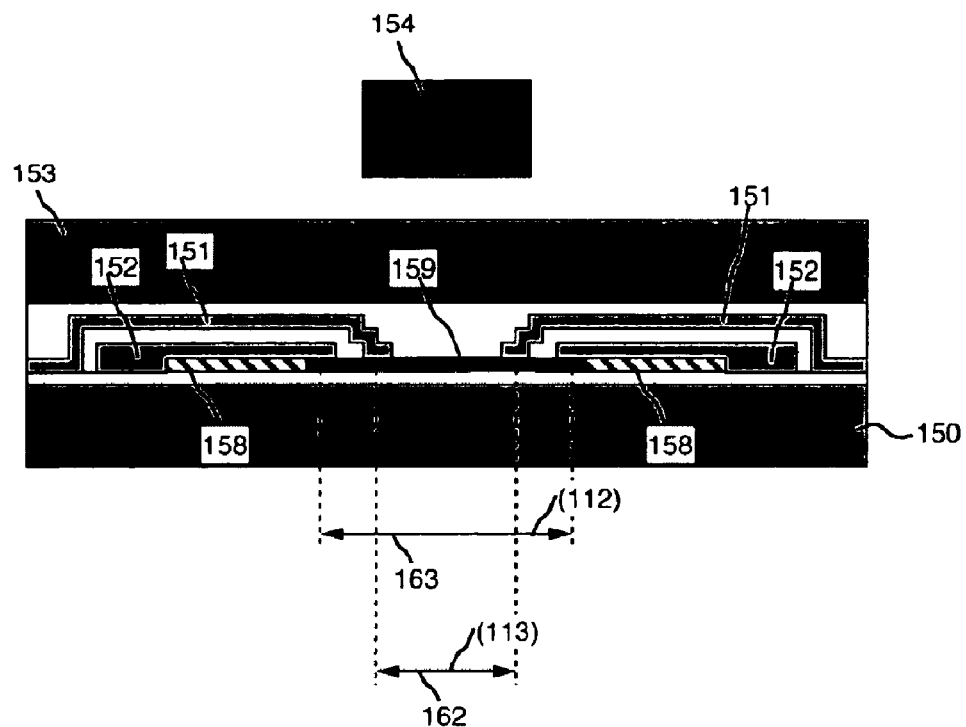
Figure 3C:
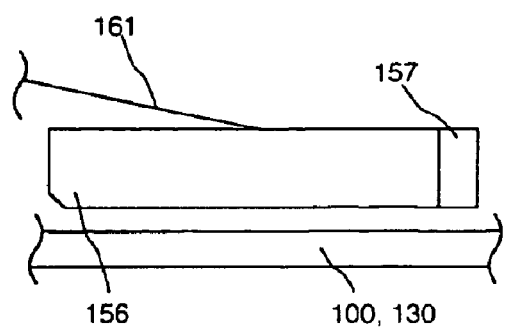

As described above, in this embodiment, though the servo magnetic head 113 is served to follow the information track 111, as shown in FIGS. 3A, 3B and 3C, the magnetic head of the invention uses a magnetoresistance element 159 served as both the servo magnetic head 112 and the reproduction magnetic head 113. Hence, when the servo magnetic head 112 follows the information track 111, at a time, the reproduction magnetic head 113 follows the information track 111 as well. Hereafter, the description will be oriented to the magnetic head according to the embodiment of the invention with reference to FIGS. 3A, 3B and 3C. As shown in FIG. 3C, like the conventional art, the magnetic head 157 according to this embodiment is mounted on a slider 156. When the information recording medium 100 or 130 is rotated, air is entered under the slider 156. The air causes the slider to be floated from the information recording medium 100 or 130. The balance of this floating force with the pressure against the medium by a suspension 161 allows the slider 156 to be floated from the information recording medium 100 or 130 by a certain length. FIG. 3A is a perspective view showing the magnetic head 157. FIG. 3B is a side view showing the magnetic head 157 viewed from the information recording medium 100 or 130. As shown in FIG. 3B, a magnetoresistance element 159 is laid between a pair of permanent magnets 158 for controlling a magnetic domain. The magnetic resistance element 159 is mounted with a pair of reproduction electrodes 151 and a pair of servo electrodes 152. The area where the magnetoresistance element 159 supplies an electric signal corresponding to the strength of a leaked magnetic field from the recording pattern, that is, the area where the element 159 can be sensitive is determined depending on the area where these electrodes 151 and 152 are mounted. For example, when reproducing the servo burst patterns 107 to 110 of the track servo area 106 shown in FIG. 1B, sensing current is flown into the servo electrodes 152. In this case, hence, the area where the element 159 can be sensitive corresponds to the servo time sensitivity width 163. On the other hand, except the track servo area 106, the sensing current is flown to the reproduction electrodes 151 so that the reproduction electrodes 151 may reproduce several patterns such as the synchronous pattern 115, the track code start pattern 116, and the track code pattern 117. In this case, the area where the element 159 can be sensitive corresponds to the reproducing time sensitivity width 162. The width of the servo magnetic head 112 means the servo time sensitivity width 163. The reproduction magnetic head 113 means the reproducing time sensitivity width 162. In general, hence, the reproducing time sensitivity time 162 is made narrower than the track pitch so as not to overlap the crosstalk leaked from the adjacent track with the reproduction signal, while during the servo time, the servo time sensitivity width 163 is made substantially equal to the width of the servo burst patterns 107 to 110 so that the servo burst patterns 107 to 110 may be completely reproduced without any non-sensitive area.

Like the prior art, an upper magnetic shield 153 and a lower magnetic shield 150 are used for the purpose of improving a resolution in reproduction. When recording the information, current is applied to a coil 155 so that a magnetic field may be generated inside a recording core 154 and the upper magnetic shield 153. By a magnetic field leaked from the information recording medium planes of the recording core 154 and the upper magnetic shield 153, a recording pattern is formed on the information recording medium 100 or 130. In addition, the magnetic head 157 is covered with a protective layer 160.

Figure 4:
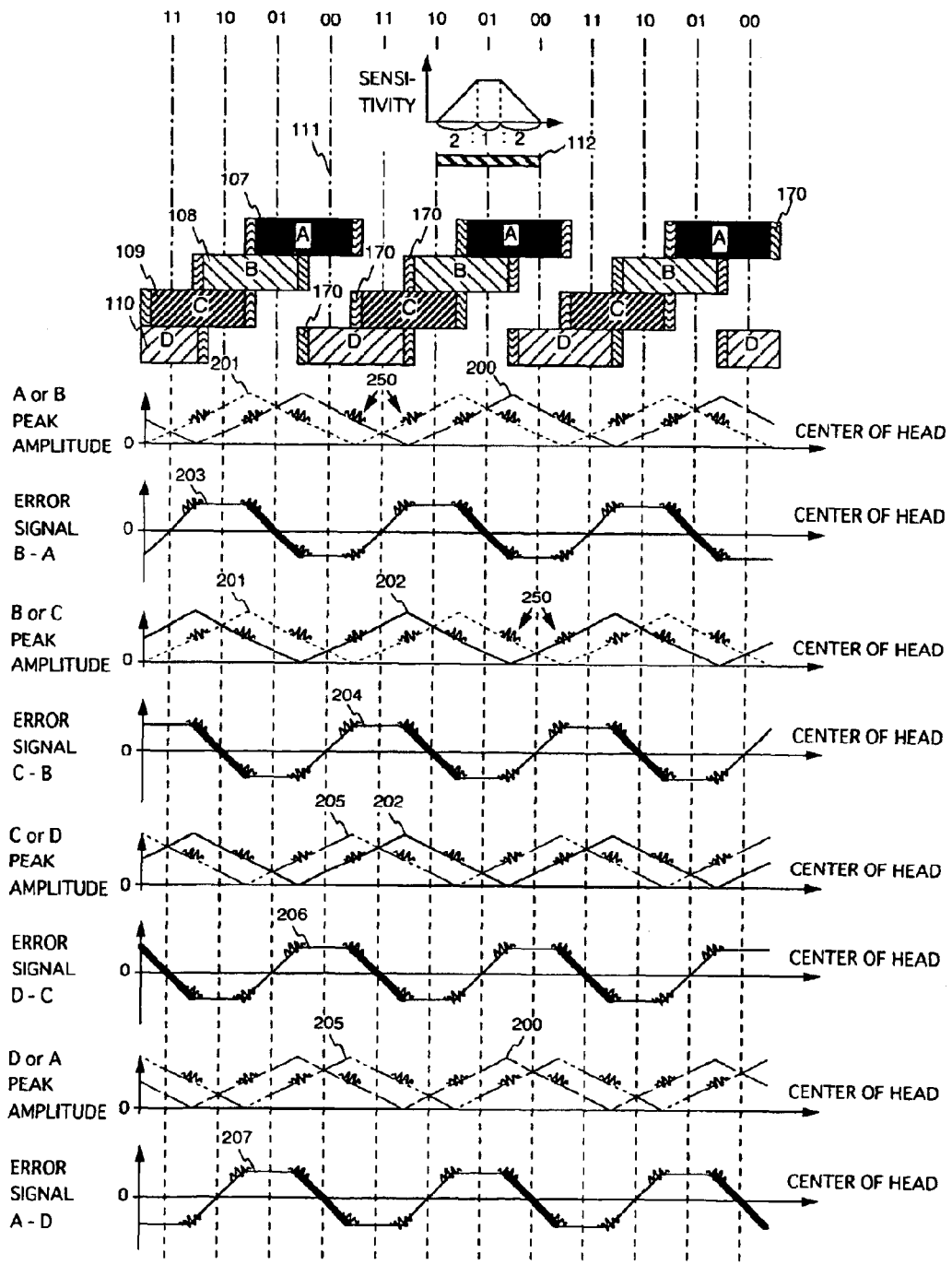
FIG. 4 is an explanatory view showing a track following error signal according to an embodiment of the present invention.

Herein, concrete means for obtaining the track following error signal is illustrated in FIG. 4. A numeral 200 denotes a peak amplitude (envelope) obtained by scanning the servo burst pattern 107 in the orthogonal direction to the information track 111 with the servo head 112. A numeral 201 denotes a peak amplitude obtained by scanning the servo burst pattern 108 in the same manner with the same means. The track following error signal 203 is a subtraction of the peak amplitude 200 from the peak amplitude 201. When the track servo is carried out in the portion indicated by a thick line of the track following error signal 203, the track servo controls the location of the servo head 112 so that the track following error signal 203 is made 'zero (0)'. Likewise, a numeral 202 denotes a peak amplitude obtained by scanning the servo burst pattern 109 in the same manner. The track following error signal 204 is a subtraction of the peak amplitude 201 from the peak amplitude 202. At a time, when the track servo is carried out in the portion indicated by a thick line of the track following error signal 204, the track servo controls the location of the servo head 112 so that the track following error signal 204 is made 'zero (0)'. Likewise, a numeral 205 denotes a peak amplitude obtained by scanning the servo burst pattern 110. The track following error signal 206 is a subtraction of the peak amplitude 202 from the peak amplitude 205. When the track servo is carried out in the portion indicated by a thick line of the track following error signal 206, the track servo controls the location of the servo head 112 so that the track following error signal 206 is made '0'. The track following error signal 207 is a subtraction of the peak amplitude 205 from the peak amplitude 200. When the track servo is carried out in the portion indicated by a thick line of the track following error signal 207, the track servo controls the location of the servo head 112 so that the track following error signal 207 is made 'zero (0)'. That is, by carrying out the track servo in the track following error signal suited to the information track 111 selected from the track following error signals 203, 204, 206 and 207 obtained by the scanning operation with the servo head 112, the servo head 112 is accurately located into the target information track 111. The most approximate track following error signal can be selected on the result obtained by reproducing the track code pattern 117 recorded before the track burst area 106. For example, if the predetermined bit of the track bit is '00', the track following error signal 207 is used, while if the predetermined bit thereof is '01', the track following error signal 203 is used. If it is '10', the track following error signal 204 is used. If it is '11', the track following error signal 206 is used.

In the information recording and reproducing method according to the embodiment of the invention, (1) The width of the servo burst pattern is made wider than the track pitch. Further, the servo burst pattern is located so as to repetitively alternate a recording portion and a non-recording portion of the pattern itself in the orthogonal direction to the information track and to prevent the end of the pattern from coinciding with the center line of the information track, while in the direction of the information track the servo burst pattern is located to be shifted in the orthogonal direction to the information track by a predetermined length.

(2) The used head is composed of one magnetoresistance element served as both the servo head having the substantially same width as that of the servo burst pattern and the reproduction head having a smaller width than the track pitch.

In this embodiment, as shown in FIG. 1A, even in the case of narrowing the track pitch for enhancing the density, the servo burst pattern having a longer width than the track pitch is reproduced by the servo magnetic head having the same width as that of the servo burst pattern. Hence, it is possible to obtain the track following error signal with a more excellent S/N ratio than the prior art. As shown in FIG. 4, the blur area 170 located on the ends of the servo burst patterns 107 to 110 does not exist on the information track 111. If the servo magnetic head 112 is following the information track 111, the blur area 170 exists in the area where the servo magnetic head 112 is made less sensitive. Hence, the blur noise 250 caused by the blur area 170 is not overlapped with the location where the track following error signal should be '0', which makes it possible to obtain the sufficient track following accuracy.

In the meantime, the magnetic head according to the embodiment of the invention is composed of the servo magnetic head for obtaining the track following error signals, the reproduction magnetic head for obtaining the reproduction signal or the like, and the recording magnetic head for recording the information as shown in FIGS. 3A and 3B. Since both the servo magnetic head and the reproduction magnetic head use one magnetoresistance element 159, these heads are composed in the substantially same manner as the conventional composite head composed of the reproduction magnetic head and the recording magnetic head. That is, the addition of the servo magnetic head for obtaining the track following error signals does not make the head structure complicated. It means that the magnetic head of this embodiment may be supplied at the substantially same cost as the conventional head.

Further, in the information recording medium according to the embodiment of the invention as shown in FIGS. 1A and 1B, the minimum width of each pattern like the track code pattern 117 and the servo burst patterns 107 to 110 recorded in the positioning area 101 of the medium 100 is twice as long as the track pitch Tp. The center of the minimum width of each pattern may be located on a midpoint between the adjacent two information tracks 111 (see FIG. 1B). In the case of recording each pattern with the conventional servo track writer, the center of the minimum width of each pattern is inevitably located on a midpoint between the adjacent tracks 111. It means that the moving interval of the recording head by the servo track writer is just required to be as short as the track pitch Tp. Hence, unlike the prior art, it is not necessary to make the track pitch Tp' set in the recording by the servo track writer shorter than the track pitch Tp set in recording or reproducing the information. In the case of narrowing the track pitch for enhancing the density, therefore, each pattern can be rapidly recorded on the positioning area 101. As mentioned above, in the prior art, Tp' is required to be Tp/2. In the present invention, thus, the use of the servo burst pattern makes it possible to improve the productivity of the information recording medium up to twice or three times. As a result, the mass production of the information recording medium is made possible without spending on new plant and equipment, so that the information recording medium can be supplied less costly.

Figure 6:
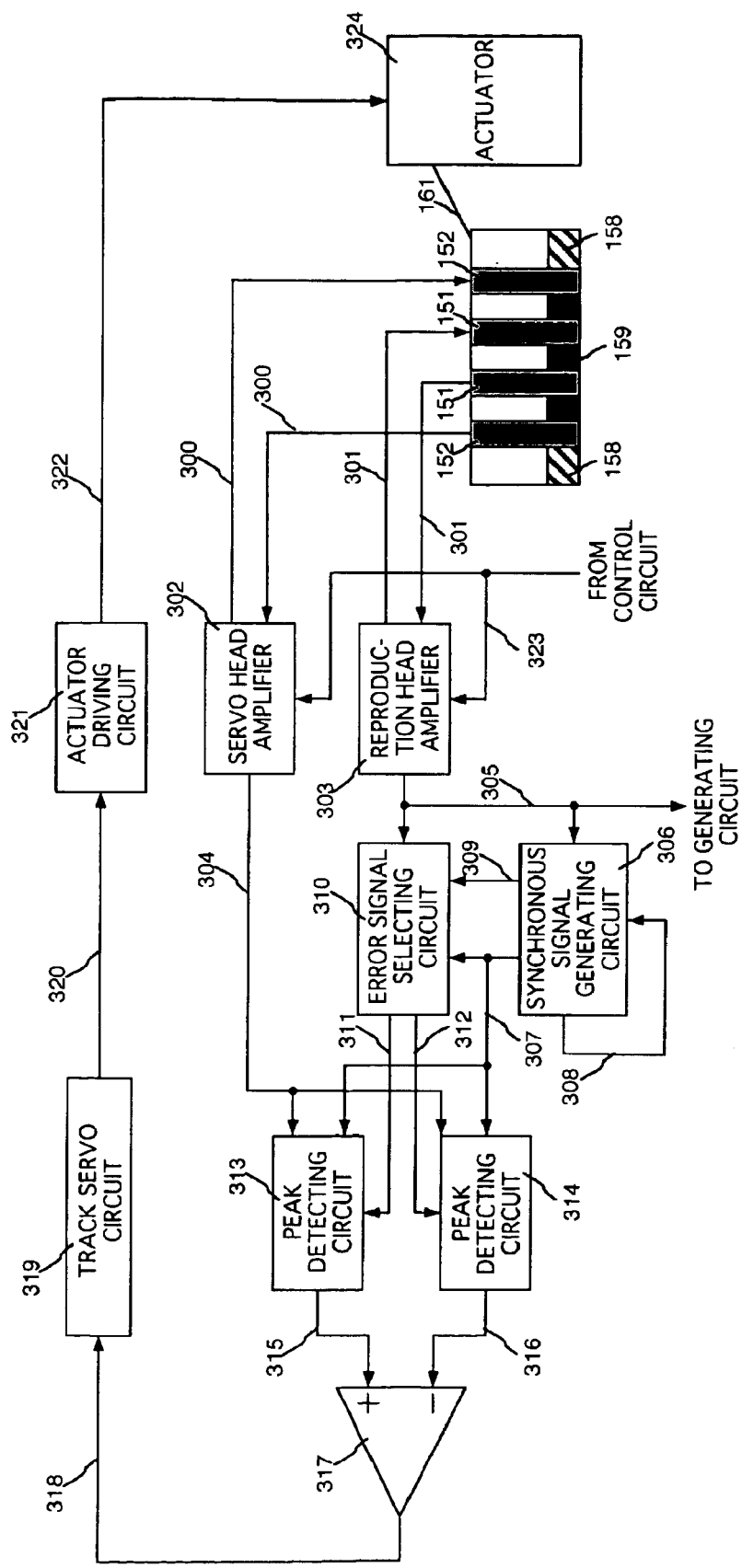
FIG. 6 is a block diagram showing a track following device according to an embodiment of the present invention.
Figure 7:
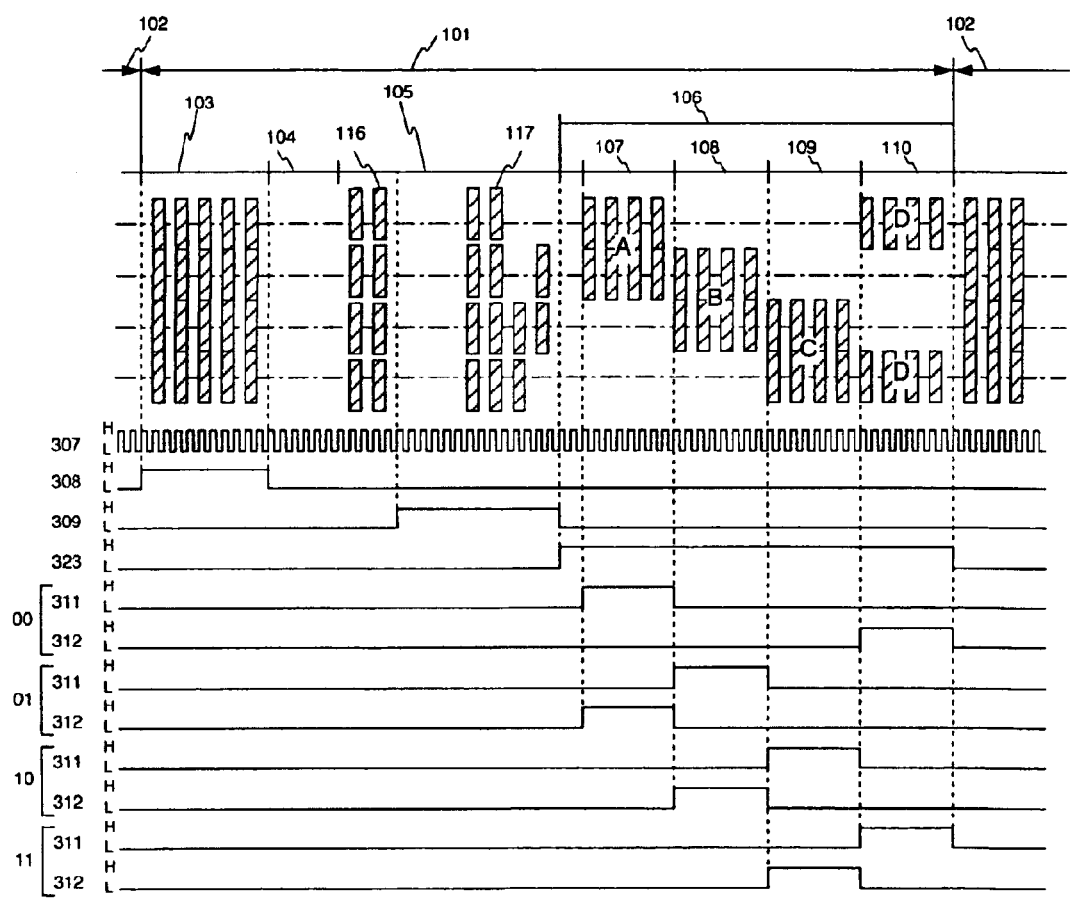
FIG. 7 is a view showing a timing relation among signals of the track following device.

Hereafter, the description will be oriented to the head locating device according to an embodiment of the invention. FIG. 6 shows a rough arrangement of the locating device in the case of recording or reproducing the information recording medium shown in FIGS. 1A and 1B with the magnetic head shown in FIGS. 3A and 3B. FIG. 7 shows a timing relation among the signals shown in FIG. 6 in the case of using the information recording medium shown in FIGS. 1A and 1B. A control circuit (not shown) generates a current switching signal 323. The signal 323 is switched into H when the reproduction magnetic head 113 stays in the track servo area 136 or L at any time except the former time. When the signal is at the H, a servo head amplifier 302 operates to supply a servo sensing signal 300 to the servo electrode 152 and then output a servo signal 304. On the other hand, when the signal is at the L, a reproduction head amplifier 303 operates to supply a reproduction sensing signal 301 to the reproduction electrode 151 and the output the reproduction signal 305.

The rotation of the information recording medium 100 causes the magnetic head 157 to reach the positioning area 101 shown in FIGS. 1A and 1B, when the reproduction magnetic head 113 operates to reproduce the synchronous pattern 115 recorded on the synchronous area 103. The reproduction signal 305 contains a reproduced waveform of the synchronous pattern 115. At a time, a synchronous signal generating circuit 306 operates to put a synchronous gate signal 308 into the H position only during the time for the synchronous area 103 and then output the signal 308. When the synchronous gate signal 308 is at the H position, the synchronous signal generating circuit 306 controls the synchronous signal 307 to be synchronized with the reproduced waveform of the synchronous pattern 115 contained in the reproduction signal 305 (see FIG. 7). This control makes the synchronous signal 307 synchronized with the rotation of the information recording medium 100. When the signal treatment in the reproduction is performed by using the synchronous signal 307, if the motor rotates irregularly, the erroneous detection of the data can be prevented.

Further rotation of the information recording medium 100 causes the magnetic head 157 to reach the erasing area 104. Since no pattern exists in the area, no waveform appears in the reproduction signal 305 when the magnetic head 157 is located in the erasing area 104. No signal time exists until the next track code start pattern 116 comes. It is a unique distance on the information recording medium 100. It is necessary to disallow the no signal time to appear in the other portions. The synchronous signal generating circuit 306 operates to detect the unique distance and then output the synchronous gate 308 being switched into the H in the next synchronous area 103 on the basis of the detected unique distance.

Further rotation of the information recording medium 100 causes the magnetic head 157 to enter into the track code area 105, when the reproduced waveform of the track code start pattern 116 appears in the reproduction signal 305. The synchronous signal generating circuit 306 operates to detect the track code start pattern 116 in the reproduction signal 305, when the circuit 306 operates to switch a locating start signal 309 into the H and then output the signal 309 (see FIG. 7). Further rotation of the information recording medium 100 causes the magnetic head 157 to reproduce the track code pattern 117, when the reproduced waveform of the track code pattern 117 appears in the reproduction signal 305. Since the locating start signal 309 is switched on, the error signal selecting circuit 310 operates to identify if the predetermined bit of the track code pattern 117 or the decoded track code is '00', '01', '10' or '11'.

Further rotation of the information recording medium 100 causes the magnetic head 157 to reach the track servo area 106, when the servo burst patterns 107 to 110 are reproduced. The servo signal 304 contains the reproduced waveforms of the servo burst patterns 107 to 110. On the other hand, peak detecting circuits 313 and 314 are used for deriving the peak amplitudes of the servo burst patterns 107 to 110 based on the servo signal 304. The gate signals 311 and 312 are put into the H in any one of the servo burst patterns 107 to 110 when these signals are outputted. The peak detecting circuit 313 operates to sample an absolute value of the servo signal 304 on the rising edge of the synchronous signal 307 only by a predetermined sampling number when the gate signal 311 is at the H and then output the average value as the peak amplitude value 315. Likewise, the peak detecting circuit 314 operates to sample an absolute value of the servo signal 340 on the rising edge of the synchronous signal 307 only by a predetermined sampling number when the gate signal 312 is at the H and then output the average value as the peak amplitude value 316. Then, an operating circuit 317 operates to generate the track following error signal 318 as a subtraction of the peak amplitude value 316 from the peak amplitude value 315. A track servo circuit 319 operates to generate a target signal 320 used for modifying the location of the servo magnetic head 112 so as to make the track following error signal 318 'zero (0)'. An actuator driving circuit 321 operates to generate an actuator driving signal 322 based on this target signal 320. An actuator 324 determines the location of the servo magnetic head 112 based on the actuator driving signal 322.

The gate signals 311 and 312 are generated in the error signal selecting circuit 310. The timings of the gate signals 311 and 312 are changed depending on the identified result of the track code pattern 117.

For example, if the predetermined bit of the track code pattern 117 or the decoded track code is determined to be '00', the gate signal 311 is switched into the H only during the time for the servo burst pattern A107, while the gate signal 312 is switched into the H only during the time for the servo burst pattern D110 (see FIG. 7). In this case, the peak amplitude value 315 corresponds to that of the servo burst pattern A107. The peak amplitude value 316 corresponds to that of the servo burst pattern D110. Unless the servo magnetic head 112 follows the track, as shown in FIG. 4, the peak amplitude value 315 behaves like the peak amplitude 200 and the peak amplitude value 316 behaves like the peak amplitude 205 according to the location of the servo magnetic head 112. Further, the track following error signal 318 behaves like the track following error signal 207. The predetermined bit is determined to be '00' when the reproduction magnetic head 113 passes through around the track '00'. Hence, the track servo circuit 319 controls the location of the servo magnetic head 112 so as to make the thick line of the track following error signal 207 'zero (0)'. As a result, the magnetic head 157 is allowed to follow the track '00'.

If the predetermined bit of the track code pattern 117 or the decoded track code is determined to be '01', the gate signal 311 is at the H only during the time for the length of the servo burst pattern B107. The gate signal 312 is at the H only during the time for the length of the servo burst pattern A107 (see FIG. 7). In this case, the peak amplitude value 315 corresponds to that of the servo burst pattern B108. The peak amplitude value 316 corresponds to that of the servo burst pattern B107. Unless the servo magnetic head 112 follows the track, as shown in FIG. 4, the peak amplitude value 315 behaves like the peak amplitude 201 and the peak amplitude value 316 behaves H like the peak amplitude 200 according to the location of the servo magnetic head 112. Further, the track following error signal 318 behaves like the track following error signal 203. The predetermined bit is determined to be '01' when the reproduction magnetic head 113 passes through around the track '01'. Hence, the track servo circuit 319 operates to control the location of the servo magnetic head 112 so as to make the thick line of the track following error signal 203 'zero (0)'. As a result, the magnetic head 157 is allowed to follow the track '01'.

If the predetermined bit of the track code pattern 117 or the decoded track code is determined to be '10', the gate signal 311 is at the H only during the time for the length of the servo burst pattern C109 and the gate signal 312 is at the H only during the time for the length of the servo burst pattern B107 (see FIG. 7). In this case, the peak amplitude value 315 corresponds to that of the servo burst pattern C109. The peak amplitude value 316 corresponds to that of the servo burst pattern B108. Unless the servo, magnetic head 112 follows the track, as shown in FIG. 4, the peak amplitude value 315 behaves like the peak amplitude 202 and the peak amplitude value 318 behaves like the peak amplitude 201 according to the location of the servo magnetic head 112. Further, the track following error signal 318 behaves like the track following error signal 204. The predetermined bit is determined to be '10' when the reproduction magnetic head 113 passes through around the track '10'. Hence, the track servo circuit 319 operates to control the location of the servo magnetic head 112 so as to make the thick line of the track following error signal 204 'zero (0)'. As a result, the magnetic head 157 is allowed to follow the track '10'.

If the predetermined bit of the track code pattern 117 or the decoded track code is determined to be '11', the gate signal 311 is at the H only during the time for the length of the servo burst pattern D110 and the gate signal 312 is at the H only during the time for the length of the servo burst pattern C109 (see FIG. 7). In this case, the peak amplitude value 315 corresponds to that of the servo burst pattern D110. The peak amplitude value 316 corresponds to that of the servo burst pattern C109. Unless the servo magnetic head 112 follows the track, as shown in FIG. 4, the peak amplitude value 315 behaves like the peak amplitude 205 and the peak amplitude value 316 behaves like the peak amplitude 202 according to the location of the servo magnetic head 112. Further, the track following error signal 318 behaves like the track following error signal 206. The predetermined bit is determined to be '11' when the reproduction magnetic head 113 passes through around the track '11'. Hence, the track servo circuit 319 operates to control the location of the servo magnetic head 112 so as to make the thick line of the track following error signal 206 'zero (0)'. As a result, the magnetic head 157 is allowed to follow the track '11'.

Hereafter, the description will be oriented to the information recording medium, the magnetic head and the information storage device according to the second embodiment of the invention with reference to the appended drawings. In the following description, the same reference numbers indicate the same or similar components.

Figure 2B:
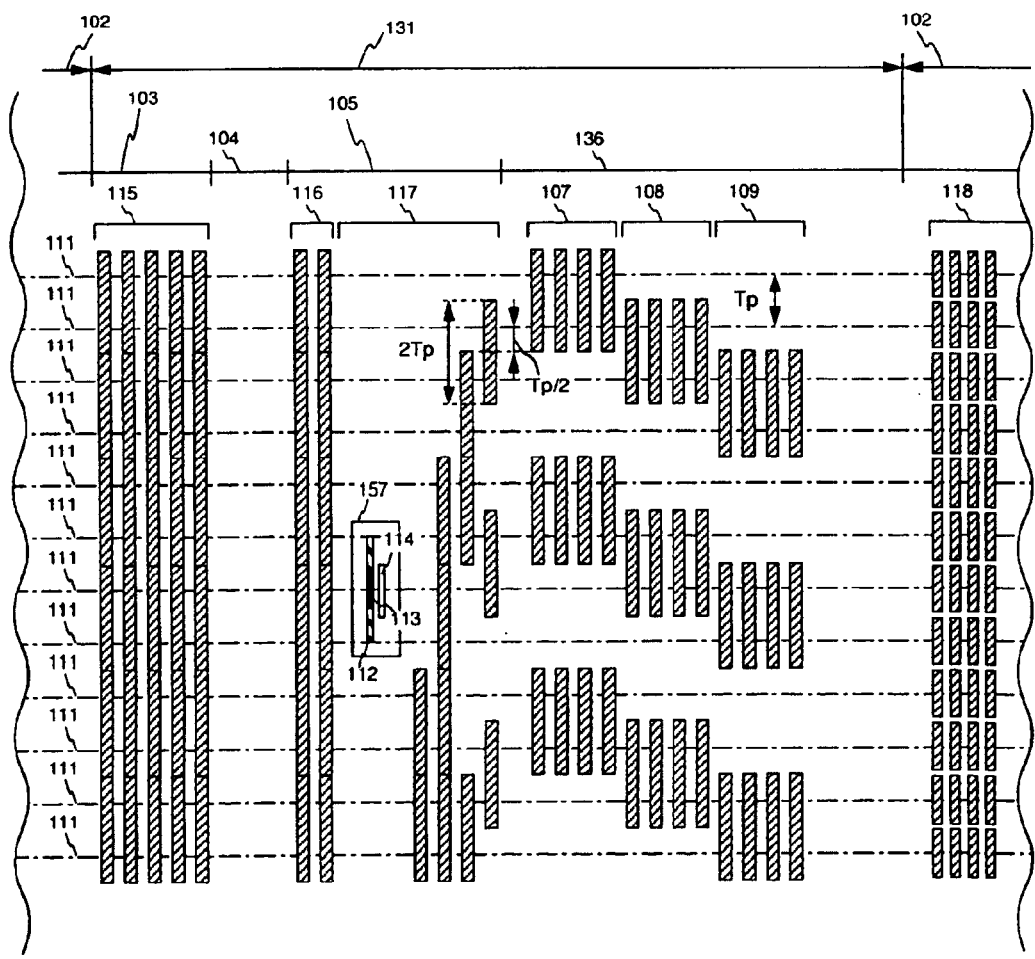

FIGS. 2A and 2B show the information recording medium 130 used in this embodiment. The information recording medium 130 is composed of a positioning area and a data storage area 102. Like the embodiment shown in FIG. 1, the user data is recorded on the data storage area 102. The positioning area 131 is served to keep the recording magnetic head 114 or the reproduction magnetic head 113 following the information track where the data is to be recorded or reproduced. The positioning area 131 includes a synchronous area 103, an erasing area 104, a track code area 105, and a track servo area 136. The synchronous area 103, the erasing area 104 and the track code area 105 are the same as those of the embodiment shown in FIG. 1. The track servo area 136 includes only the servo burst pattern A107, the servo burst pattern B108, and the servo burst pattern C109 recorded thereon. The servo burst pattern D110 that is recorded in the track servo area 136 shown in FIG. 1 is not recorded in the second embodiment.

The magnetic head is the same as that used in the first embodiment (refer to FIGS. 3A, 3B and 3C).

Figure 8:
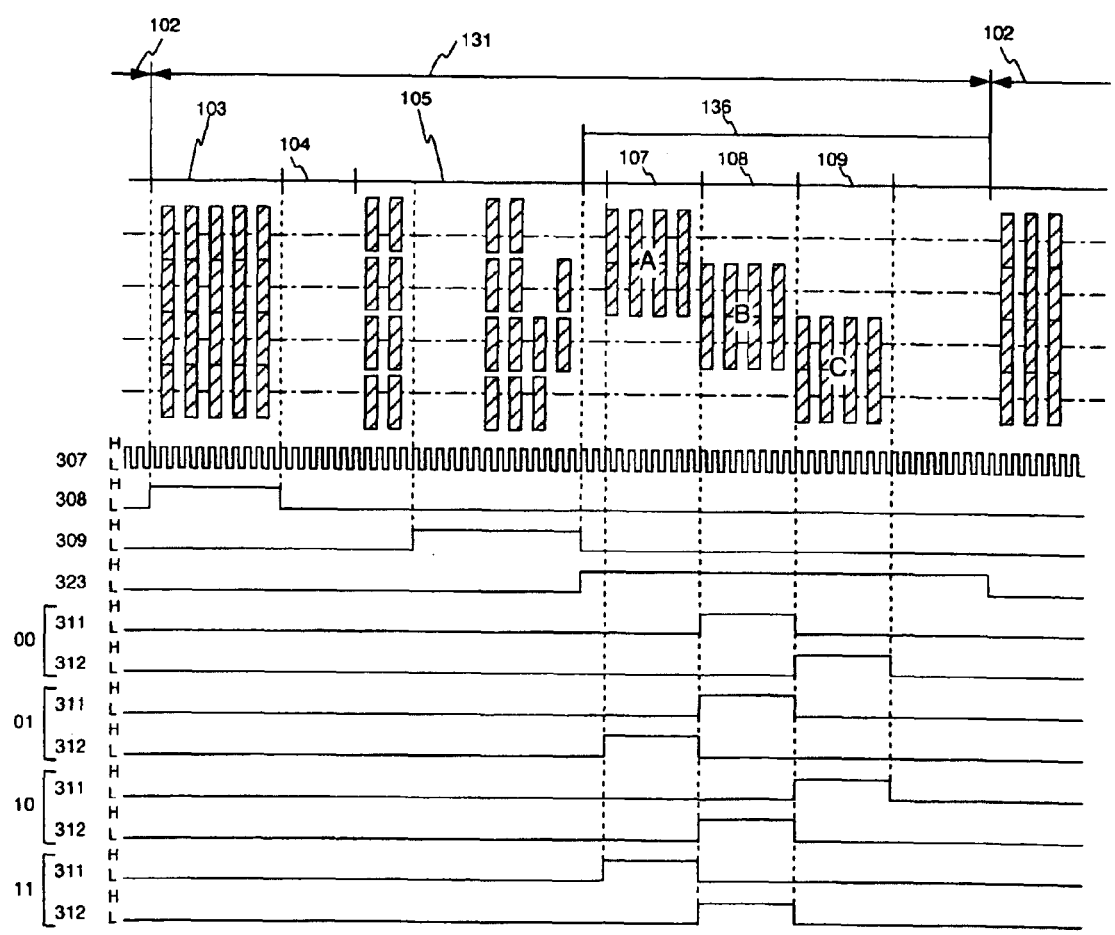
FIG. 8 is a view showing a timing relation among signals of the track following device.

Hereafter, the description will be oriented to the head locating device according to the second embodiment of the invention. Also in this embodiment, the head locating device shown in FIG. 6 is used. However, the timings of the gate signals 311 and 312 generated by the error signal selecting circuit 310 are different from those of the first embodiment. The operation except that is the same as that of the first embodiment and thus the description thereabout will be left out. Hence, the detailed description will be oriented to the timings of the gate signals 311 and 312 generated by the error signal selecting circuit 310. FIG. 8 shows the timing relation among the signals shown in FIG. 6 in the case of using the information recording medium shown in FIGS. 2A and 2B.

The gate signals 311 and 312 are generated by the error signal selecting circuit 310. Like the first embodiment, the timings of these gate signals 311 and 312 are varied depending on the identified result of the track code pattern 117.

Figure 5:
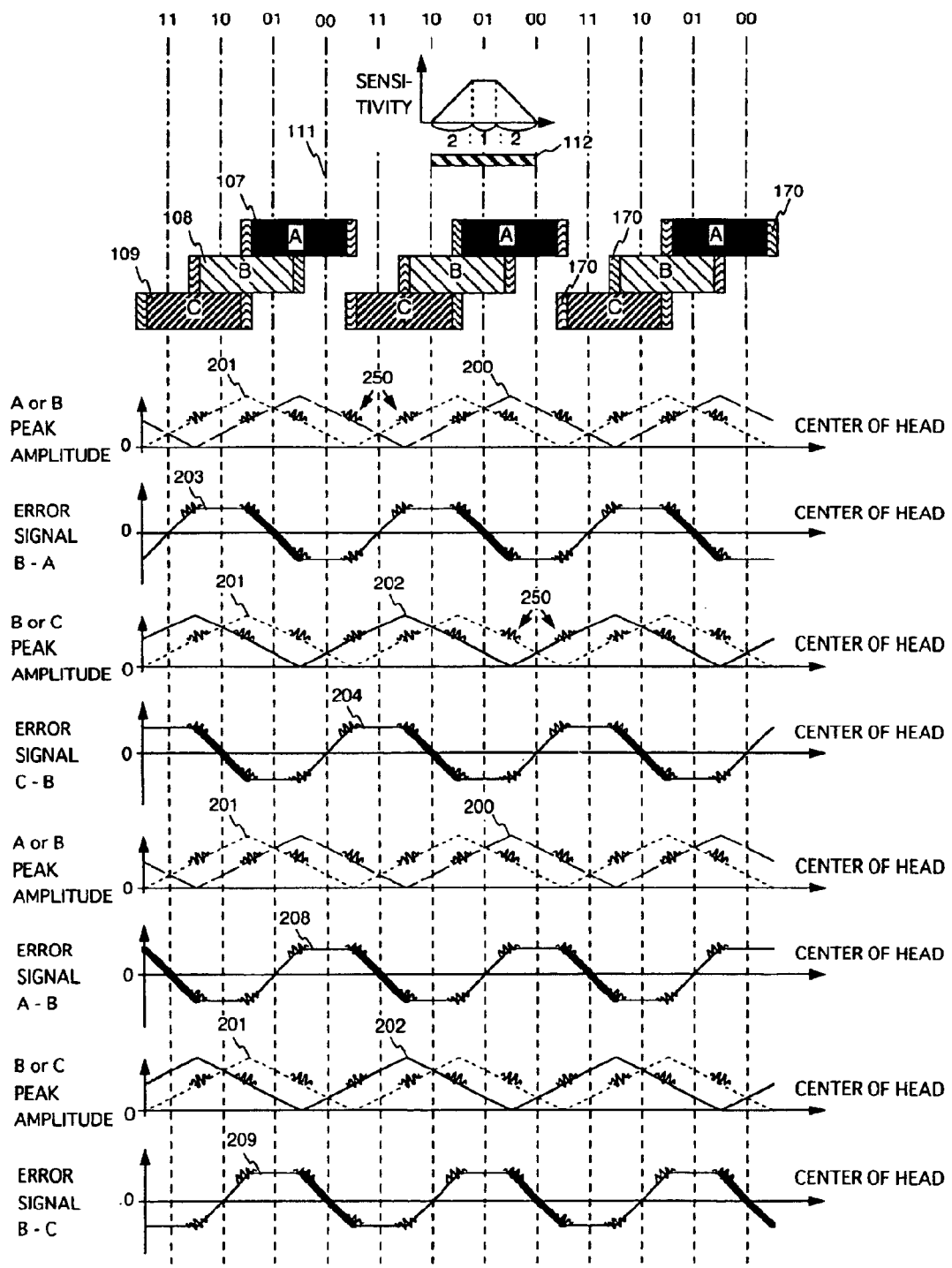
FIG. 5 is an explanatory view showing a track following error signal according to an embodiment of the present invention.

For example, if the predetermined bit of the track code pattern 117 or the decoded track code is determined to be '00', the gate signal 311 is at the H only during the time for the length of the servo burst pattern B108 and the gate signal 312 is at the H only during the time for the length of the servo burst pattern C109 (see FIG. 8). In this case, the peak amplitude value 315 corresponds to that of the servo burst pattern B109. The peak amplitude value 316 corresponds to that of the servo burst pattern B108. The peak amplitude value 316 corresponds to that of the servo burst pattern C109. Unless the servo magnetic head 112 follows the track, as shown in FIG. 5, the peak amplitude value 315 behaves like the peak amplitude 201 and the peak amplitude value 316 behaves like the peak amplitude 202 according to the location of the servo magnetic head 112. Further, the track following error signal 318 behaves like the track following error signal 209. The predetermined bit is determined to be '00' when the reproduction magnetic head 113 passes through around the track '00'. Hence, the track servo circuit 319 operates to control the operation of the servo magnetic head 112 so as to make the thick line of the track following error signal 209 'zero (0)'. As a result, the magnetic head 157 is allowed to follow the track '00'.

If the predetermined bit of the track code pattern 117 or the decoded track code is determined to be '01', the gate signal 311 is at the H only during the time for the length of the servo burst pattern B108 and the gate signal 312 is at the H only during the time for the length of the servo burst pattern B108 (see FIG. 8). In this case, the peak amplitude value 315 corresponds to that of the servo burst pattern B108. The peak amplitude value 316 corresponds to that of the servo burst pattern A107. Unless the servo magnetic head 112 follows the track, as shown in FIG. 5, the peak amplitude value 315 behaves like the peak amplitude 201 and the peak amplitude value 316 behaves like the peak amplitude 200 according to the location of the servo magnetic head 112. Further, the track following error signal 318 behaves like the track following error signal 203. The predetermined bit is determined to be '01' when the reproduction magnetic head 113 passes through around the track '01'. Hence, the track servo circuit 319 operates to control the operation of the servo magnetic head 112 so as to make the thick line of the track following error signal 203 'zero (0)'. As a result, the magnetic head 157 is allowed to follow the track '01'.

If the predetermined bit of the track code pattern 117 or the decoded track code is determined to be '10', the gate signal 311 is at the H only during the time for the length of the servo burst pattern C109 and the gate signal 312 is at the H only during the time for the length of the servo burst pattern B108 (see FIG. 8). In this case, the peak amplitude value 315 corresponds to that of the servo burst pattern C109. The peak amplitude value 316 corresponds to that of the servo burst pattern B108. Unless the servo magnetic head 112 follows the track, as shown in FIG. 5, the peak amplitude value 315 behaves like the peak amplitude 202 and the peak amplitude value 316 behaves like the peak amplitude 201 according to the location of the servo magnetic head 112. Further, the track following error signal 318 behaves like the track following error signal 204. The predetermined bit is determined to '10' when the reproduction magnetic head 113 passes through around the track '10'. Hence, the track servo circuit 319 operates to control the operation of the servo magnetic head 112 so as to make the thick line of the track following error signal 204 'zero (0)'. As a result, the magnetic head 157 is allowed to follow the track '10'.

If the predetermined bit of the track code pattern 117 or the decoded track code is determined to be '11', the gate signal 311 is at the H only during the time for the length of the servo burst pattern A107. The gate signal 312 is at the H only during the time for the length of the servo burst pattern B108 (see FIG. 8). In this case, the peak amplitude value 315 corresponds to that of the servo burst pattern A107. The peak amplitude value 316 corresponds to that of the servo burst pattern B108. Unless the servo magnetic head 112 follows the track, as shown in FIG. 5, the peak amplitude value 315 behaves like the peak amplitude 200 and the peak amplitude value 316 behaves like the peak amplitude 201 according to the location of the servo magnetic head 112. Further, the track following error signal 318 behaves like the track following error signal 208. The predetermined bit is determined to be '11' when the reproduction magnetic head 113 passes through around the track '11'. Hence, the track servo circuit 319 operates to control the location of the servo magnetic head 112 so as to make the thick line of the track following error signal 208 'zero (0)'. As a result, the magnetic head 157 is allowed to follow the track '11'.

The synchronous pattern 115, the track code start pattern 116, the track code pattern 117 and the servo burst patterns 107 to 110 are pre-recorded on the positioning area 101 shown in FIGS. 1A and 1B or the positioning area 131 shown in FIGS. 2A and 2B through the use of the servo track writer. The pattern width in recording these patterns is equal to the track pitch Tp. Unlike the prior art, it is not necessary to record the patterns with a smaller width than the track pitch Tp like Tp/3 or Tp/2. As a result, even in the case of narrowing the track pitch for enhancing the density, the synchronous pattern 115, the track code start pattern 116, the track code pattern 117, and the servo burst patterns 107 to 110 can be accurately recorded on the positioning area 101 through the use of the conventional servo track writer.

In the information recording medium according to the embodiment of the invention shown in FIGS. 1A and 1B or 2A and 2B, the minimum width of each pattern, such as the track code pattern 117 and the servo burst patterns 107 to 110 recorded on the positioning area 101 shown in FIG. 1B or the positioning area 131 shown in FIG. 2B, is twice as long as the track pitch Tp. The center of the minimum width of each pattern may be located on a midpoint between the adjacent two information tracks 111 (see FIG. 1B). In the case of recording each pattern with the conventional servo track writer, the center of the minimum width of each pattern is located precisely on the midpoint between the adjacent tracks ill. It means that the interval of moving the recording head by the servo track writer may be the track pitch Tp. Unlike the prior art, therefore, it is not necessary to make the track pitch Tp' for the recording operation by the servo track writer narrower than the track pitch Tp at which the information is recorded or reproduced. Hence, even in the case of narrowing the track pitch for enhancing the density, each of those patterns can be recorded on the positioning area 101 at fast speed. As mentioned above, the prior art has been required to narrow Tp' into Tp/2, while the servo burst pattern of the present invention makes it possible to enhance the productivity of the information recording medium twice or three times.

In the first or the second embodiment, by detecting the predetermined bit of the track code pattern 117 or the predetermined bit of the decoded track code, the most approximate track following error signal 318 to the target track is generated. In place, for improving the reliability of detecting the predetermined bit, it is possible to pre-record an error detecting code or an error correcting code in the track code pattern 117.

The foregoing embodiment has been described with the example in which each width of the servo burst patterns is twice as long as the track pitch. In actual, the width of the servo burst pattern is not limited to a double of the track pitch. It may be a triple or a quadruple, for example.

Later, the description will be oriented to the information recording medium, the magnetic head and the information storage device according to the third embodiment of the invention with reference to the appended drawings. In the following description, the same reference numbers indicate the same or similar components.

Figure 9A:
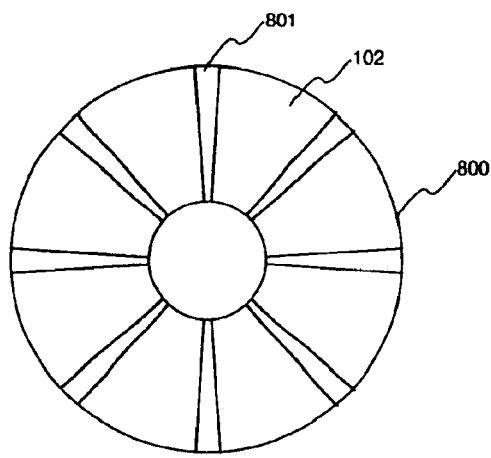
FIGS. 9A and 9B are views showing an information recording medium according to another embodiment of the present invention.
Figure 9B:
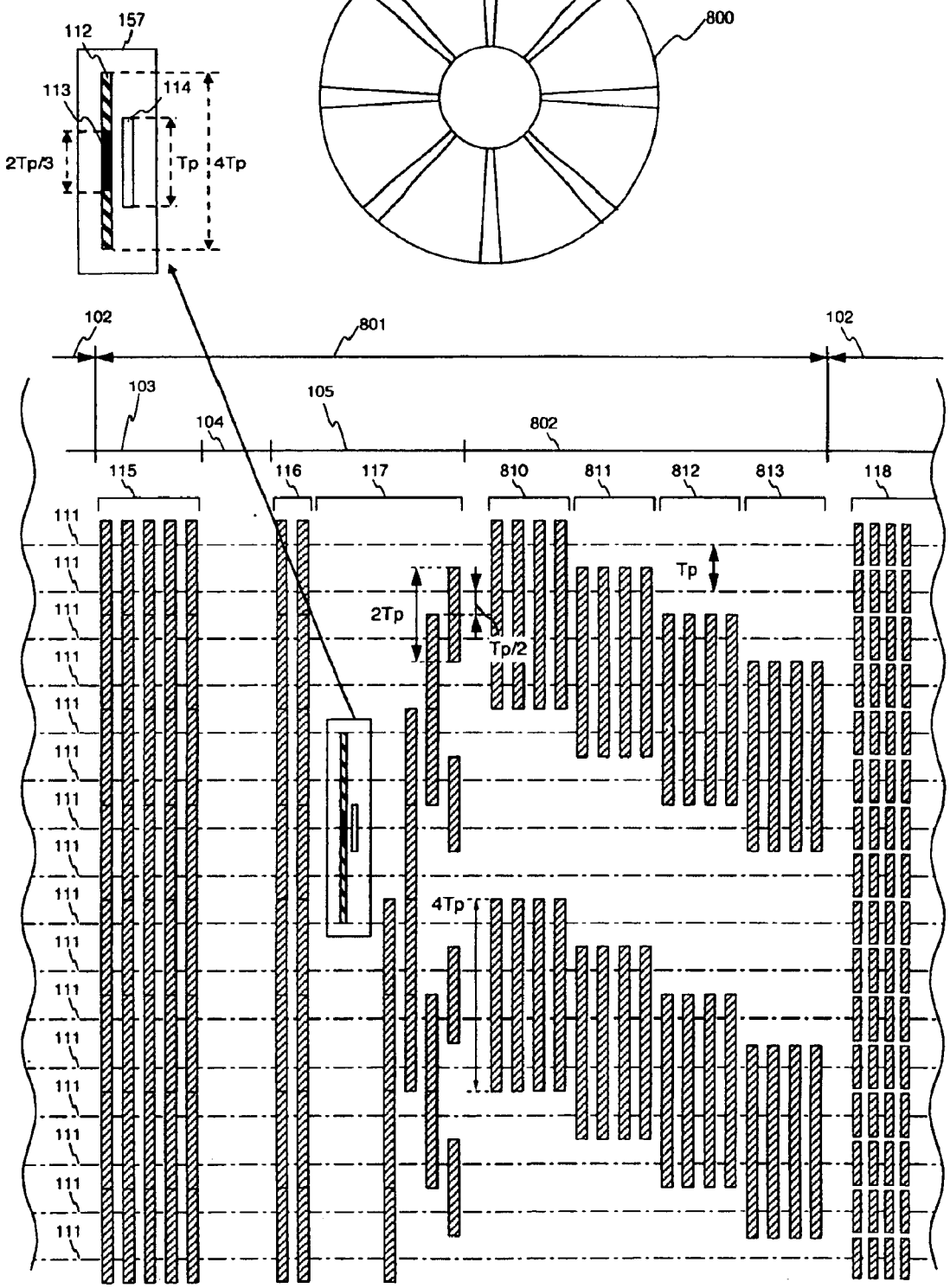

FIGS. 9A and 9B are an overall view and a track-magnified view of an information recording medium 800 used in this embodiment. The information recording medium 800 is composed of a positioning area 801 and a data storage area 102. Like the embodiments shown in FIGS. 1A and 1B and FIGS. 2A and 2B, the user data is recorded on the data storage area 102. The positioning area 801 is served to keep the recording magnetic head 114 and the reproduction magnetic head 113 following the information track where the data is to be recorded or reproduced. The positioning area 801 includes a synchronous area 103, an erasing area 104, a track code area 105 and a track servo area 802. The synchronous area 103, the erasing area 104 and the track code area 105 are the same as those shown in FIG. 1. The track servo area 802 includes a servo burst pattern A810, a servo burst pattern B811, a servo burst pattern C812, and a servo burst pattern D813 recorded thereon.

Herein, the width of the servo burst pattern is four times as long as the track width, that is, set to 4 Tp.

As the magnetic head in the first embodiment is used a servo magnetic head 112 whose servo time sensitivity width 163 is four times as long as the track pitch (see FIG. 3).

Figure 11:
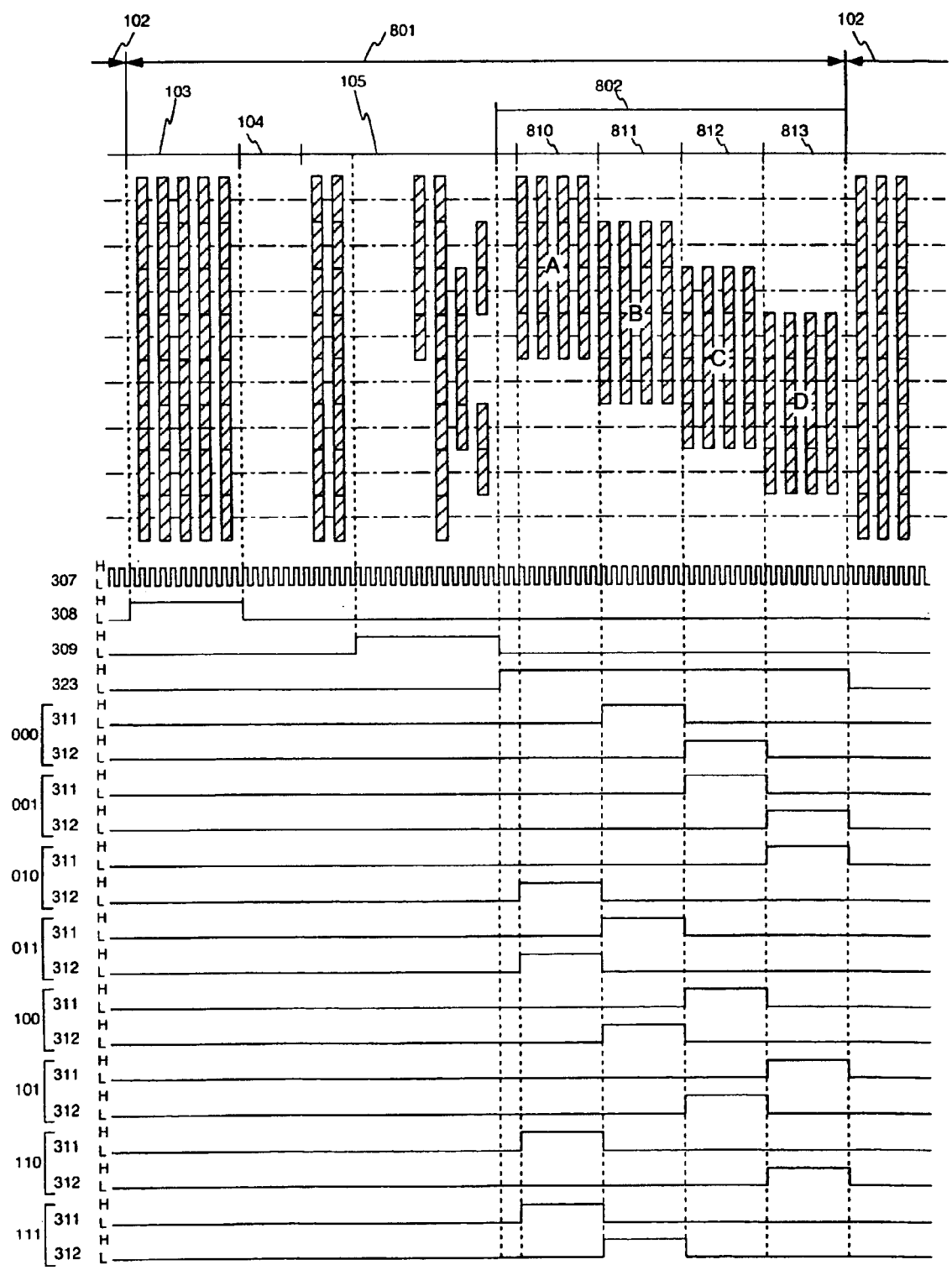
FIG. 11 is a diagram showing a signal timing in the embodiment.
Figure 12A:
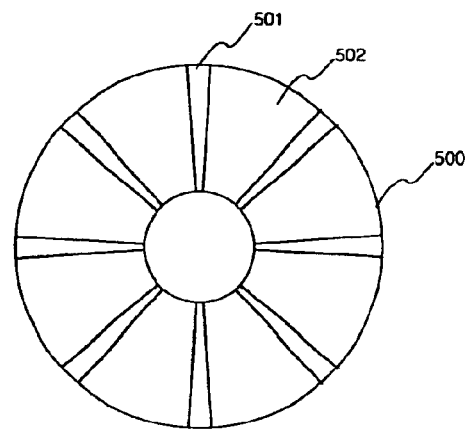
FIGS. 12A and 12B are views showing a discussed prior art.
Figure 12B:
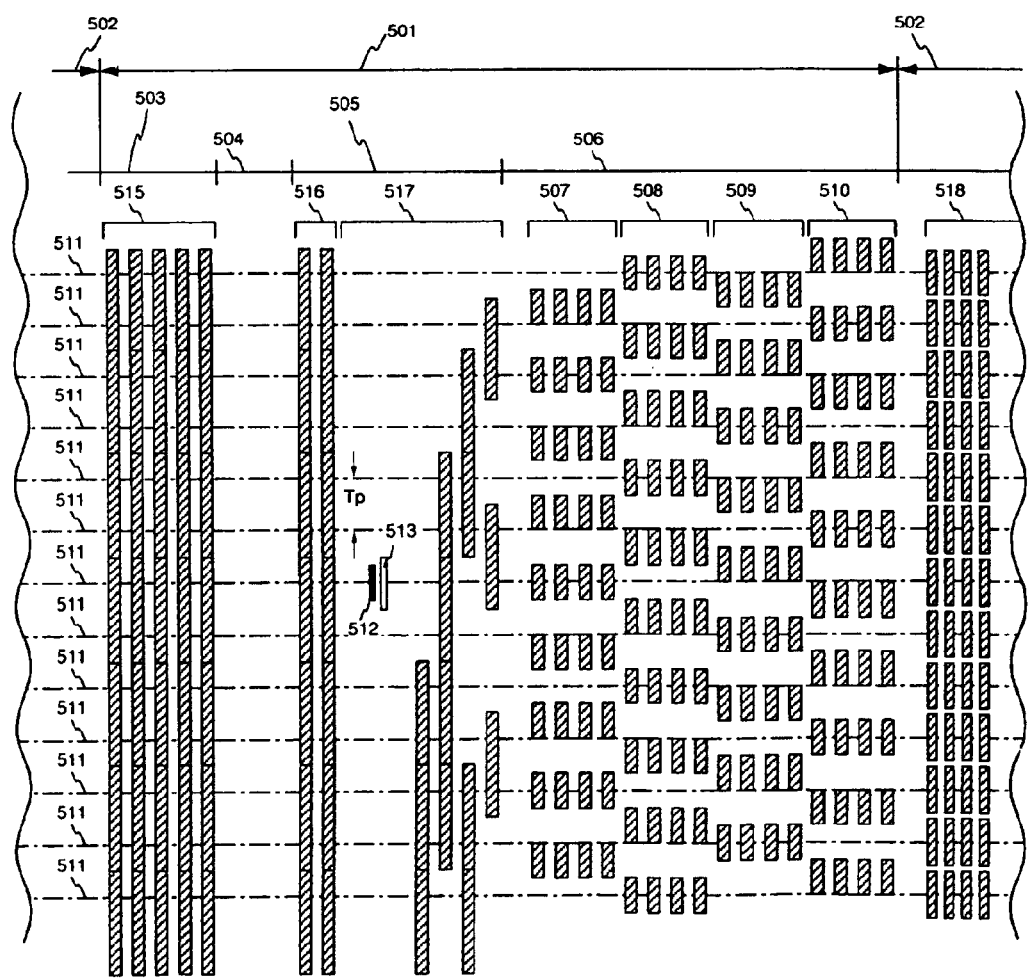
Figure 13A:
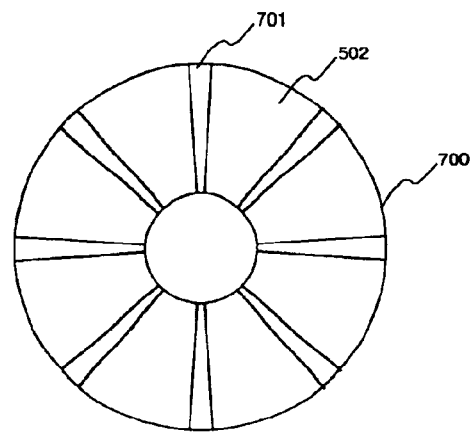
FIGS. 13A and 13B are views showing another discussed prior art.
Figure 13B:
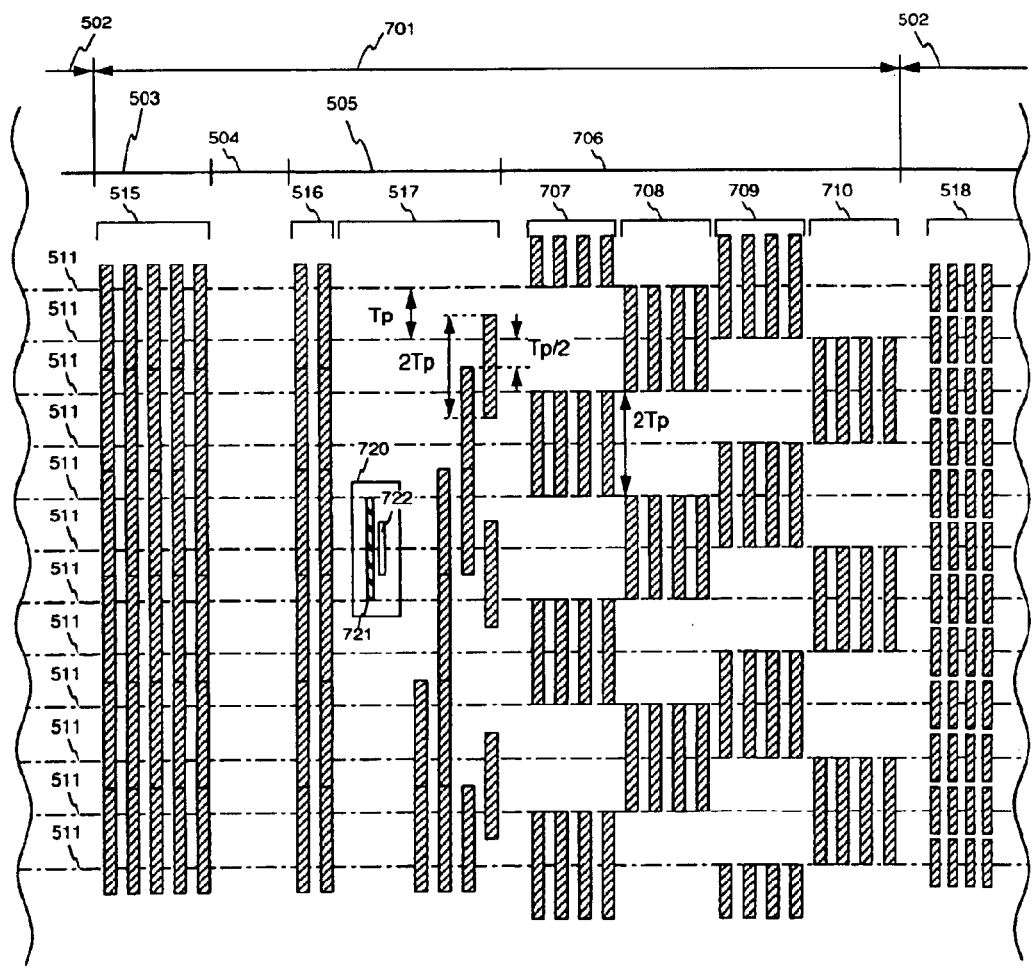
Figure 14:
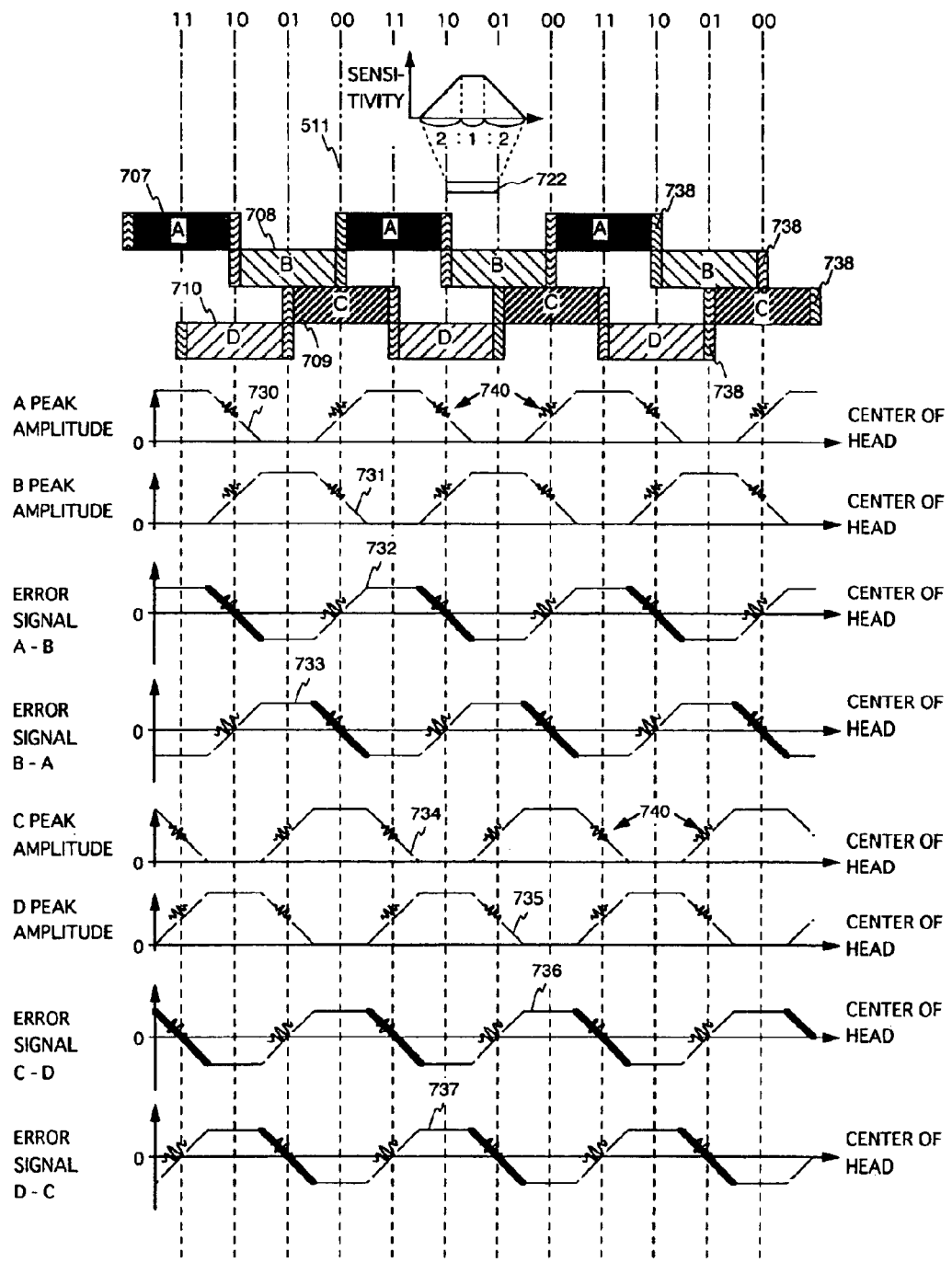
FIG. 14 is an explanatory view showing a track following error signal of the discussed art.

Hereafter, the description will be oriented to the head locating device according to the third embodiment of the present invention. In this embodiment is used the head locating device shown in FIG. 6, excepting that the timings of the gate signals 311 and 312 generated by the error signal selecting circuit 310 are different from those of the first or the second embodiment. The operation except that is likewise to that of the first embodiment. Hence, the description thereabout is left out. Later, the detailed description will be oriented to the timings of the gate signals 311 and 312 generated by the error signal selecting circuit 310. FIG. 11 shows the timing relation of the signals shown in FIG. 6 in the case of using the information recording medium shown in FIGS. 9A and 9B.

The gate signals 311 and 312 are generated by the error signal selecting circuit 310. Like the first embodiment, the timings of these gate signals 311 and 312 are variable depending on the identified result of the track code pattern 117.

Figure 10:
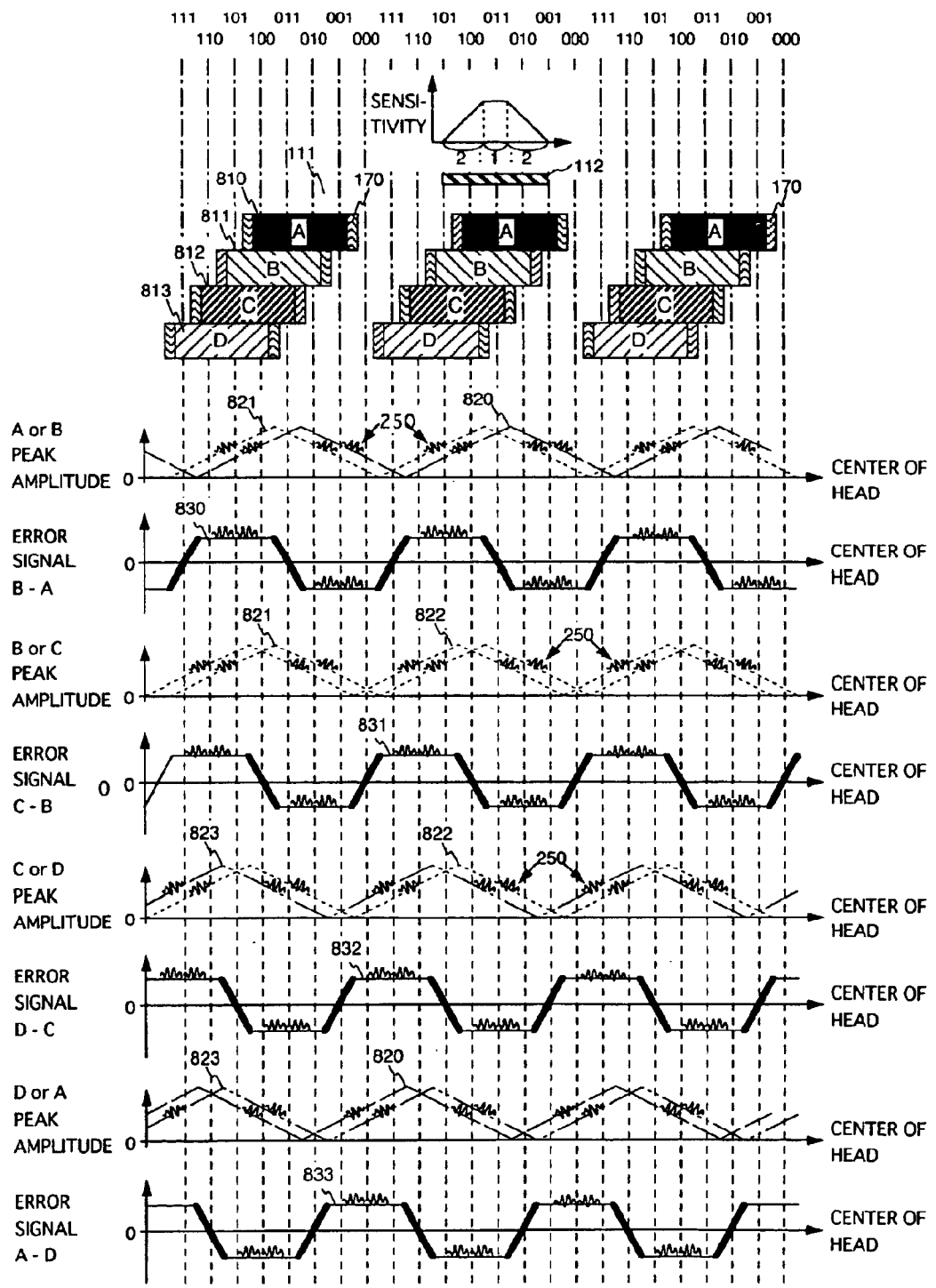
FIG. 10 is a view showing a track following error signal according to the embodiment of the present invention.

For example, if the predetermined bit of the track code pattern 117 or the decoded track code is determined to be '000', the gate signal 311 is at the H only during the time for the length of the servo burst pattern B11. The gate signal 312 is at the H only during the time for the length of the servo burst pattern C812 (see FIG. 11). In this case, the peak amplitude value 315 corresponds to that of the servo burst pattern B811. The peak amplitude value 316 corresponds to that of the servo burst pattern C812. Unless the servo magnetic head 112 follows the track, as shown in FIG. 10, the peak amplitude value 315 behaves like the peak amplitude 821 and the peak amplitude value 316 behaves like the peak amplitude 822 according to the location of the servo magnetic head 112. Further, the track following error signal 318 behaves like the track following error signal 831 of the opposite polarity. The predetermined bit is determined to be '000' when the reproduction magnetic head 113 passes through around the track '000'. Hence, the track servo circuit 319 operates to control the location of the servo magnetic head 112 so as to make the thick-line portion of the error signal 831 of the opposite polarity 'zero (0)'. As a result, the magnetic head 157 is allowed to follow the track '000'.

If the predetermined bit of the track code pattern 117 or the decoded track code is determined to be '001', the gate signal 311 is at the H only during the time for the length of the servo burst pattern C812. The gate signal 312 is at the H only during the time for the length of the servo burst pattern D813 (see FIG. 11). In this case, the peak amplitude value 315 corresponds to that of the servo burst pattern C812. The peak amplitude value 316 corresponds to that of the servo burst pattern D813. Unless the servo magnetic head 112 follows the track, as shown in FIG. 10, the peak amplitude value 315 behaves like the peak amplitude 822 and the peak amplitude value 316 behaves like the peak amplitude 823 according to the location of the servo magnetic head 112. Further, the track following error signal 318 behaves like the error signal 832 of the opposite polarity. The predetermined bit is determined to '001' when the reproduction magnetic head 113 passes through around the track '0001'. The track servo circuit 319 operates to control the location of the servo magnetic head 112 so as to make the thick line of the track following error signal 832 of the opposite polarity 'zero (0)'. As a result, the magnetic head 157 is allowed to follow the track '001'.

If the predetermined bit of the track code pattern 117 or the decoded track code is determined to be '0101', the gate signal 311 is at the H only during the time for the length of the servo burst pattern D813. The gate signal 312 is at the H only during the time for the length of the servo burst pattern A810 (see FIG. 11). In this case, the peak amplitude value 315 corresponds to that of the servo burst pattern D813. The peak amplitude value 316 corresponds to that of the servo burst pattern A810. Unless the servo magnetic head 112 follows the track, as shown in FIG. 13, the peak amplitude value 315 behaves like the peak amplitude 823 and the peak amplitude value 316 behaves like the peak amplitude 820 according to the location of the servo magnetic head 112. Further, the track following error signal 318 behaves like the track following error signal 833 of the opposite polarity. The predetermined bit is determined to be '010' when the reproduction magnetic head 113 passes through around the track '010'. Hence, the track servo circuit 319 operates to control the operation of the servo magnetic head 112 so as to make the thick line of the track following error signal 833 of the opposite polarity 'zero (0)'. As a result, the magnetic head 157 is allowed to follow the track '010'.

If the predetermined bit of the track code pattern 117 or the decoded track code is determined to be '011', the gate signal is at the H only during the time for the length of the servo burst pattern B811. The gate signal 312 is at the H only during the time for the length of the servo burst pattern A810 (see FIG. 11). In this case, the peak amplitude value 315 corresponds to that of the servo burst pattern B811. The peak amplitude value 316 corresponds to that of the servo burst pattern A810. Unless the servo magnetic head 112 follows the track, as shown in FIG. 10, the peak amplitude value 315 behaves like the peak amplitude 821 and the peak amplitude value 316 behaves like the peak amplitude 820 according to the location of the servo magnetic head 112. Further, the track following error signal 318 behaves like the track following error signal 830. The predetermined bit is determined to be '011' when the reproduction magnetic head 113 passes through around the track '011'. Hence, the track servo circuit 319 operates to control the location of the servo magnetic head 112 so as to make the thick line of the error signal 830 'zero (0)'. As a result, the magnetic head 157 is allowed to follow the track '011'.

If the predetermined bit of the track code pattern 117 or the decoded track code is determined to be '100', the gate signal 311 is at the H only during the time for the length of the servo burst pattern C812. The gate signal 312 is at the H only during the time for the length of the servo burst pattern B811 (see FIG. 11). In this case, the peak amplitude value corresponds to that of the servo burst pattern C812. The peak amplitude value 316 corresponds to that of the servo burst pattern B811. Unless the servo magnetic head 112 follows the track, as shown in FIG. 10, the peak amplitude value 315 behaves like the peak amplitude 821 and the peak amplitude value 316 behaves like the peak amplitude 822 according to the location of the servo magnetic head 112. Further, the track following error signal 318 behaves like the track following error signal 831. The predetermined bit is determined to be '100' when the reproduction magnetic head 113 passes through around the track '100'. Hence, the track servo circuit 319 operates to control the operation of the servo magnetic head 112 so as to make the thick line of the track following error signal 831 'zero (0)'. As a result, the magnetic head 157 is allowed to follow the track '100'.

If the predetermined bit of the track code pattern 117 or the decoded track code is determined to be '101', the gate signal 311 is at the H only during the time for the length of the servo burst pattern D813. The gate signal 312 is at the H only during the time for the length of the servo burst pattern C812 (see FIG. 11). In this case, the peak amplitude value 315 corresponds to that of the servo burst pattern D813. The peak amplitude value 316 corresponds to that of the servo burst pattern C812. Unless the servo magnetic head 112 follows the track, as shown in FIG. 10, the peak amplitude value 315 behaves like the peak amplitude 823 and the peak amplitude value 316 behaves like the peak amplitude 822 according to the location of the servo magnetic head 112. Further, the track following error signal 318 behaves like the track following error signal 832. The predetermined bit is determined to be '101' when the reproduction magnetic head 113 passes through around the track '101'. Hence, the track servo circuit 319 operates to control the operation of the servo magnetic head 112 so as to make the thick line of the track following error signal 832 'zero (0)'. As a result, the magnetic head 157 is allowed to follow the track '101'.

If the predetermined bit of the track code pattern 117 or the decoded track code is determined to be '110', the gate signal 311 is at the H only during the time for the length of the servo burst pattern A810. The gate signal 312 is at the H only during the time for the length of the servo burst pattern D813 (see FIG. 11). In this case, the peak amplitude value 315 corresponds to that of the servo burst pattern A810. The peak amplitude value 316 corresponds to that of the servo burst pattern D813. Unless the servo magnetic head 112 follows the track, as shown in FIG. 10, the peak amplitude value 315 behaves like the peak amplitude 820 and the peak amplitude value 316 behaves like the peak amplitude 823 according to the location of the servo magnetic head 112. Further, the track following error signal 318 behaves like the track following error signal 833. The predetermined bit is determined to be '110' when the reproduction magnetic head 113 passes through around the track '110'. Hence, the track servo circuit 319 operates to control the operation of the servo magnetic head 112 so as to make the thick line of the track following error signal 833 'zero (0)'. As a result, the magnetic head 157 is allowed to follow the track '110'.

If the predetermined bit of the track code pattern 117 or the decoded track code is determined to be '111', the gate signal 311 is at the H only during the time for the length of the servo burst pattern A810. The gate signal 312 is at the H only during the time for the length of the servo burst pattern B811 (see FIG. 11). In this case, the peak amplitude value 315 corresponds to that of the servo burst pattern A810. The peak amplitude value 316 corresponds to that of the servo burst pattern B811. Unless the servo magnetic head 112 follows the track, as shown in FIG. 10, the peak amplitude value 315 behaves like the peak amplitude 820 and the peak amplitude value 316 behaves like the peak amplitude 821 according to the location of the servo magnetic head 112. Further, the track following error signal 318 behaves like the error signal 830 of the opposite polarity. The predetermined bit is determined to be '111' when the reproduction magnetic head 113 passes through around the track '111'. Hence, the track servo circuit 319 operates to control the operation of the servo magnetic head 112 so as to make the thick line of the track following error signal 830 of the opposite polarity 'zero (0)'. As a result, the magnetic head 157 is allowed to follow the track '111'.

The synchronous pattern 115, the track code start pattern 116, the track code pattern 117, and the servo burst patterns 810 to 813 are pre-recorded on the positioning area 101 shown in FIGS. 9A and 9B or the positioning area 131 shown in FIGS. 2A and 2B through the use of the servo track writer. The pattern width provided in recording the pattern is equal to the track pitch Tp. Unlike the prior art, it is not necessary to record the pattern of a smaller width than the track pitch Tp, such as Tp/3 or Tp/2. As a result, even in the case of narrowing the track pitch for enhancing the density, through the use of the conventional servo track writer, the synchronous pattern 115, the track code start pattern 116, the track code pattern 117, and the servo burst patterns 810 to 813 can be recorded on the positioning area 101 with high accuracy.

In the information recording medium according to the embodiment of the invention shown in FIGS. 1A and 1B, FIGS. 2A and 2B, or FIGS. 12A and 12B, the minimum width of each pattern, such as the track code pattern 117 or the servo burst patterns 107, to 110 recorded on the positioning area 101 shown in FIGS. 1A and 1B or the positioning area 131 shown in FIGS. 2A and 2B, is twice as long as the track pitch Tp. The center of the minimum width of each pattern can be located on a midpoint between the adjacent two information tracks 111 (see FIG. 1B). In the case of recording each pattern with the conventional servo track writer, the center of the minimum width of each pattern is inevitably located on a midpoint between the adjacent tracks 1111. It means that the interval of the moving action of the recording head by the servo track writer is just required to be the track interval Tp. Hence, unlike the prior art, it is not necessary to make the track pitch Tp' provided in the recording action by the servo track writer narrower than the track pitch Tp provided in recording or reproducing information. Even in the case of narrowing the track for enhancing the density, therefore, each of those patterns can be recorded on the positioning area 101 at fast speed. As mentioned above, the prior art has been required to narrow the pitch Tp' into Tp/2, while the use of the servo burst pattern of the present invention makes it possible to enhance the productivity of the information recording medium twice or three times. As a result, the mass production of the information recording medium is made possible without spending on new plant and equipment, so that the information recording medium may be supplied less costly.

In the first, the second, or the third embodiment, by detecting the predetermined bit of the track code pattern 117 or the decoded track code, the most approximate track following error signal 318 to the target track is generated. In place, for improving the reliability in detecting the predetermined bit, it is possible to pre-record the error detecting code or the error correcting code in the track code pattern 117.

INDUSTRIAL APPLICABILITY

As set forth above, according to the embodiments of the present invention, narrowing the track pitch makes it possible to obtain the track following error signal with an excellent S/N ratio, thereby carrying out the highly accurate tracking operation. Further, the interval of the moving action of the recording head by the track servo writer may be made equal to the information track pitch, so that the productivity of the information recording medium is surprisingly improved.

What is claimed is:

1. An information recording medium having a servo burst pattern pre-recorded at a predetermined position so as to allow a recording head or a reproduction head to follow a predetermined information track, for recording information on said information track by scanning the predetermined information track with said recording head when recording the information or reproducing information on said information track by scanning said track with said reproduction head when reproducing the information, comprising:

a group of servo burst patterns, each of said servo burst patterns having the same width in the orthogonal direction to said information track and two integer times or more integer times as long a width as said information track, each of said servo burst patterns being located to have respective ends thereof not coinciding with a center line of said information track, each of said servo burst patterns being located so as to repetitively alternate a recording portion with a non-recording portion in the orthogonal direction to said information track, and each of said servo burst patterns is shifted in the orthogonal direction to said information track with respect to an adjacent of said servo burst patterns by a predetermined value.

2. The information recording medium as claimed in claim 1, wherein each of said servo burst patterns is shifted in the orthogonal direction of said information track by an integer number times the width of the information track.

3. The information recording medium as claimed in any one of claims 1 and 2, wherein three servo burst patterns recorded at a predetermined position of said medium are located in the direction of said information track.

4. The information recording medium as claimed in any one of claims 1 and 2, wherein four servo burst patterns recorded at a predetermined position of said medium are located in the direction of said information track.

5. The information recording medium as claimed in claim 1, wherein each of said servo burst patters is shifted in the orthogonal direction to said information track with respect to an adjacent of said servo burst patterns by a predetermined value in the same direction.

* * * * *